US010032338B2

(12) United States Patent
Lark et al.

(10) Patent No.: US 10,032,338 B2
(45) Date of Patent: Jul. 24, 2018

(54) GAMING SYSTEM AND METHOD PROVIDING A GAMING TOURNAMENT HAVING A VARIABLE AVERAGE EXPECTED POINT PAYOUT

(71) Applicant: IGT, Las Vegas, NV (US)

(72) Inventors: David R. Lark, Reno, NV (US); Benjamin R. Holsclaw, Sparks, NV (US); Bradford Brown, Sparks, NV (US); Ronald P. Papson, Reno, NV (US); Robert W. Ruymann, Reno, NV (US)

(73) Assignee: IGT, Las Vegas, NV (US)

( * ) Notice: Subject to any disclaimer, the term of this patent is extended or adjusted under 35 U.S.C. 154(b) by 328 days.

(21) Appl. No.: 14/862,914

(22) Filed: Sep. 23, 2015

(65) Prior Publication Data

US 2017/0084127 A1 Mar. 23, 2017

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2018.01) |
| ***G07F 17/32*** | (2006.01) |

(52) U.S. Cl.

CPC ........ *G07F 17/3276* (2013.01); *G07F 17/323* (2013.01); *G07F 17/3213* (2013.01); *G07F 17/3246* (2013.01); *G07F 17/3269* (2013.01)

(58) Field of Classification Search

CPC ............... G07F 17/323; G07F 17/3213; G07F 17/3246; G07F 17/3269

USPC ........................................................... 463/16

See application file for complete search history.

(56) References Cited

U.S. PATENT DOCUMENTS

| | | | |
|---|---|---|---|
| 4,114,882 | A | 9/1978 | Mau |
| 4,339,798 | A | 7/1982 | Hedges et al. |
| 4,373,727 | A | 2/1983 | Hooker et al. |

(Continued)

FOREIGN PATENT DOCUMENTS

| | | |
|---|---|---|
| AU | 42326/89 | 3/1990 |
| AU | 2007237214 | 12/2007 |

(Continued)

OTHER PUBLICATIONS

Diamond Dash Advertisement [online] [retrieved on Mar. 31, 2004]. Retrieved from the Internet at <URL: http:/ /www.arcadeplanet.com/images/diamond_dash.jpg>.

(Continued)

*Primary Examiner* — Omkar Deodhar
*Assistant Examiner* — Wei Lee
(74) *Attorney, Agent, or Firm* — Neal, Gerber & Eisenberg LLP

(57) ABSTRACT

The present disclosure is directed to a gaming system and method providing a gaming tournament having a variable average expected point payout. Generally, during the gaming tournament, the gaming system enables each tournament player to play a tournament game at an EGM. The gaming system accumulates one or more tournament points for the tournament player when a play of the tournament game results in a winning outcome. At various points during the tournament, the gaming system increases or decreases an average expected point payout of the tournament game to change the tournament players' gaming experience.

20 Claims, 5 Drawing Sheets

(56) References Cited

U.S. PATENT DOCUMENTS 4,440,036 A 4/1984 Hooker et al.
4,508,345 A 4/1985 Okada et al.
4,582,324 A 4/1986 Koza et al.
4,669,731 A 6/1987 Clarke
4,679,143 A 7/1987 Hagiwara
4,695,053 A 9/1987 Vazquez, Jr. et al.
4,817,951 A 4/1989 Couch et al.
4,837,728 A 6/1989 Barrie et al.
4,856,787 A 8/1989 Itkis
4,871,171 A 10/1989 Rivero
5,042,809 A 8/1991 Richardson
5,083,271 A 1/1992 Thacher et al.
5,114,155 A 5/1992 Tillery et al.
5,116,055 A 5/1992 Tracy et al.
5,152,529 A 10/1992 Okada
5,186,460 A 2/1993 Fongeallaz et al.
5,242,163 A 9/1993 Fulton
5,259,613 A 11/1993 Marnell, II
5,265,874 A 11/1993 Dickinson et al.
5,275,400 A 1/1994 Weingardt et al.
5,288,081 A 2/1994 Breeding
5,290,033 A 3/1994 Bittner et al.
5,359,510 A 10/1994 Sabaliauskas
5,393,057 A 2/1995 Marnell, II
5,397,125 A 3/1995 Adams
5,417,430 A 5/1995 Breeding
5,472,197 A 12/1995 Gwiasda et al.
5,544,892 A 8/1996 Breeding
5,560,603 A 10/1996 Seelig et al.
5,564,701 A 10/1996 Dettor
5,580,309 A 12/1996 Piechowiak et al.
5,611,730 A 3/1997 Weiss
5,645,486 A 7/1997 Nagao et al.
5,655,961 A 8/1997 Acres et al.
5,664,998 A 9/1997 Seelig et al.
5,702,304 A 12/1997 Acres et al.
5,711,715 A 1/1998 Ringo et al.
5,741,183 A 4/1998 Acres et al.
5,746,646 A 5/1998 Bezick et al.
5,752,882 A 5/1998 Acres et al.
5,755,621 A 5/1998 Marks et al.
5,758,875 A 6/1998 Giacalone, Jr.
5,761,647 A 6/1998 Boushy
5,768,382 A 6/1998 Schneier
5,769,422 A 6/1998 Stromer et al.
5,769,716 A 6/1998 Saffari et al.
5,779,242 A 7/1998 Kaufman
5,779,544 A 7/1998 Seelig et al.
5,779,549 A 7/1998 Walker et al.
5,806,045 A 9/1998 Biorge et al.
5,816,918 A 10/1998 Kelly et al.
5,820,459 A 10/1998 Acres et al.
5,820,460 A 10/1998 Fulton
5,823,874 A 10/1998 Adams
5,823,879 A 10/1998 Goldberg et al.
5,833,536 A 11/1998 Davids et al.
5,836,817 A 11/1998 Acres et al.
5,846,132 A 12/1998 Junkin
5,851,148 A 12/1998 Brune et al.
D404,436 S 1/1999 McGahn et al.
5,855,515 A 1/1999 Pease et al.
5,855,516 A 1/1999 Eiba
5,876,283 A 3/1999 Parra et al.
5,876,284 A 3/1999 Acres et al.
5,882,260 A 3/1999 Marks et al.
5,898,587 A 4/1999 Bell et al.
5,902,184 A 5/1999 Bennett
5,902,983 A 5/1999 Crevelt et al.
5,911,418 A 6/1999 Adams
5,917,725 A 6/1999 Thacher et al.
5,919,088 A 7/1999 Weiss
5,924,927 A 7/1999 Matsuura et al.
5,935,000 A 8/1999 Sanchez, III et al.
5,941,772 A 8/1999 Paige
5,947,820 A 9/1999 Morro et al.
5,951,397 A 9/1999 Dickinson
5,976,015 A 11/1999 Seelig et al.
5,980,384 A 11/1999 Barrie
5,993,316 A 11/1999 Coyle et al.
5,997,400 A 12/1999 Seelig et al.
6,012,982 A 1/2000 Piechowiak et al.
6,012,983 A 1/2000 Walker et al.
6,015,344 A 1/2000 Kelly et al.
6,019,374 A 2/2000 Breeding
6,039,648 A 3/2000 Guinn et al.
6,048,271 A 4/2000 Barcelou
6,062,981 A 5/2000 Luciano, Jr.
6,077,162 A 6/2000 Weiss
6,082,887 A 7/2000 Feuer et al.
6,089,975 A 7/2000 Dunn
6,089,976 A 7/2000 Schneider et al.
6,093,100 A 7/2000 Singer et al.
6,102,400 A 8/2000 Scott et al.
6,110,043 A 8/2000 Olsen
6,113,098 A 9/2000 Adams
6,113,492 A 9/2000 Walker et al.
6,120,378 A 9/2000 Moody et al.
6,128,550 A 10/2000 Heidel et al.
6,135,885 A 10/2000 Lermusiaux
6,142,872 A 11/2000 Walker et al.
6,146,273 A 11/2000 Olsen
6,155,925 A 12/2000 Giobbi et al.
6,159,095 A 12/2000 Frohm et al.
6,159,097 A 12/2000 Gura
6,159,098 A 12/2000 Slomiany et al.
6,162,122 A 12/2000 Acres et al.
6,165,071 A 12/2000 Weiss
6,165,072 A 12/2000 Davis et al.
6,168,521 B1 1/2001 Luciano et al.
6,174,237 B1 1/2001 Stephenson
6,179,711 B1 1/2001 Yoseloff
6,186,893 B1 2/2001 Walker et al.
6,190,255 B1 2/2001 Thomas et al.
6,193,606 B1 2/2001 Walker et al.
6,193,610 B1 2/2001 Junkin
6,203,010 B1 3/2001 Jorasch et al.
6,206,782 B1 3/2001 Walker et al.
6,210,275 B1 4/2001 Olsen
6,210,277 B1 4/2001 Stefan
6,224,482 B1 5/2001 Bennett
6,224,484 B1 5/2001 Okuda et al.
6,224,486 B1 5/2001 Walker et al.
6,231,445 B1 5/2001 Acres
6,238,287 B1 5/2001 Komori et al.
6,238,288 B1 5/2001 Walker et al.
6,244,958 B1 6/2001 Acres
6,254,483 B1 7/2001 Acres
6,257,981 B1 7/2001 Acres et al.
6,287,202 B1 9/2001 Pascal et al.
6,309,299 B1 10/2001 Weiss
6,309,307 B1 10/2001 Krause et al.
6,312,332 B1 11/2001 Walker et al.
6,315,662 B1 11/2001 Jorasch et al.
6,315,668 B1 11/2001 Metke et al.
6,319,122 B1 11/2001 Packes, Jr. et al.
6,319,127 B1 11/2001 Walker et al.
6,322,451 B1 11/2001 Miura
6,334,614 B1 1/2002 Breeding
6,352,479 B1 3/2002 Sparks, II
6,354,592 B1 3/2002 Virzi
6,361,441 B1 3/2002 Walker et al.
6,364,765 B1 4/2002 Walker et al.
6,368,218 B2 4/2002 Angell, Jr.
6,375,567 B1 4/2002 Acres
6,390,299 B1 5/2002 Mellon et al.
6,406,371 B1 6/2002 Baba et al.
6,416,408 B2 7/2002 Tracy et al.
6,419,583 B1 7/2002 Crumby et al.
6,425,828 B2 7/2002 Walker et al.
6,431,983 B2 8/2002 Acres
RE37,885 E 10/2002 Acres et al.
6,468,155 B1 10/2002 Zucker et al.
6,468,156 B1 10/2002 Hughs-Baird et al.
6,471,591 B1 10/2002 Crumby

(56) References Cited

U.S. PATENT DOCUMENTS 6,503,145 B1 1/2003 Webb
6,508,709 B1 1/2003 Karmarker
6,514,139 B2 2/2003 Levitan
6,533,664 B1 3/2003 Crumby
6,543,774 B1 4/2003 Taylor
6,565,434 B1 5/2003 Acres
6,569,013 B1 5/2003 Taylor
6,572,471 B1 6/2003 Bennett
6,585,592 B1 7/2003 Crumby
6,604,997 B2 8/2003 Saidakovsky et al.
6,605,001 B1 8/2003 Tarantino
6,607,195 B2 8/2003 Vancura
6,607,438 B2 8/2003 Baerlocher et al.
6,625,578 B2 9/2003 Spaur et al.
6,638,170 B1 10/2003 Crumby
6,648,753 B1 11/2003 Tracy et al.
6,652,378 B2 11/2003 Cannon et al.
6,656,047 B1 12/2003 Tarantino et al.
6,688,973 B2 2/2004 Satloff et al.
6,699,124 B2 3/2004 Suchocki
6,712,693 B1 3/2004 Hettinger
6,712,699 B2 3/2004 Walker et al.
6,712,702 B2 3/2004 Goldberg et al.
6,729,959 B1 5/2004 Walker et al.
6,733,390 B2 5/2004 Walker et al.
6,746,016 B2 6/2004 Perrie et al.
6,755,743 B1 6/2004 Yamashita et al.
6,775,580 B2 8/2004 Jira et al.
6,786,824 B2 9/2004 Cannon
6,790,143 B2 9/2004 Crumby
6,800,030 B2 10/2004 Acres
6,802,778 B1 10/2004 Lemay et al.
6,805,629 B1 10/2004 Weiss
6,814,664 B2 11/2004 Baerlocher et al.
6,817,948 B2 11/2004 Pascal et al.
6,832,958 B2 12/2004 Acres et al.
6,837,793 B2 1/2005 McClintic
6,843,724 B2 1/2005 Walker et al.
6,843,725 B2 1/2005 Nelson
6,848,997 B1 2/2005 Hashimoto et al.
6,860,808 B2 3/2005 Levitan
6,860,810 B2 3/2005 Cannon et al.
6,863,612 B2 3/2005 Willis
6,869,361 B2 3/2005 Sharpless et al.
6,875,110 B1 4/2005 Crumby
6,884,167 B2 4/2005 Walker et al.
6,887,151 B2 5/2005 Leen et al.
6,887,159 B2 5/2005 Leen et al.
6,890,258 B2 5/2005 Weiss
6,896,616 B2 5/2005 Weiss
6,899,628 B2 5/2005 Leen et al.
6,908,390 B2 6/2005 Nguyen et al.
6,929,546 B2 8/2005 Moore et al.
6,929,550 B2 8/2005 Hisada
6,932,708 B2 8/2005 Yamashita et al.
6,935,958 B2 8/2005 Nelson
6,939,229 B2 9/2005 McClintic
RE38,812 E 10/2005 Acres et al.
6,964,608 B1 11/2005 Koza
6,966,832 B2 11/2005 Leen et al.
6,979,267 B2 12/2005 Leen et al.
6,984,177 B2 1/2006 Lydon et al.
6,991,538 B2 1/2006 Cannon
7,014,563 B2 3/2006 Stephan et al.
7,192,352 B2 3/2007 Walker et al.
7,198,569 B2 4/2007 Wolf et al.
7,303,475 B2 12/2007 Britt et al.
7,364,510 B2 4/2008 Walker et al.
7,387,571 B2 6/2008 Walker et al.
7,452,272 B2 11/2008 Walker et al.
7,470,187 B2 12/2008 Baerlocher et al.
7,470,188 B2 12/2008 Baerlocher et al.
7,470,189 B2 12/2008 Baerlocher et al.
7,470,190 B2 12/2008 Baerlocher et al.
7,563,167 B2 7/2009 Walker et al.
7,588,496 B2 9/2009 Van Asdale
7,684,874 B2 3/2010 Schlottmann et al.
7,684,882 B2 3/2010 Baerlocher et al.
7,689,302 B2 3/2010 Schlottmann et al.
7,690,996 B2 4/2010 Iddings et al.
7,704,144 B2 4/2010 Abbott
7,740,534 B2 6/2010 Walker et al.
7,771,274 B2 8/2010 Walker et al.
7,824,267 B2 11/2010 Cannon et al.
7,828,648 B2 11/2010 Jackson
7,878,899 B2 2/2011 Duhamel et al.
7,950,994 B2 5/2011 Berman et al.
7,976,389 B2 7/2011 Cannon et al.
8,002,621 B2 8/2011 Mattice et al.
8,002,630 B2 8/2011 Nguyen et al.
8,021,222 B2 9/2011 Walker et al.
8,308,549 B2 11/2012 Baerlocher et al.
8,398,473 B2 3/2013 Baerlocher et al.
8,419,519 B2 4/2013 Aoki et al.
8,419,546 B2 4/2013 Decasa et al.
8,500,546 B2 8/2013 Walker et al.
8,529,333 B2 9/2013 Berman et al.
9,111,416 B2 8/2015 Cannon et al.
9,123,210 B2 9/2015 Bennett et al.
2001/0004609 A1 6/2001 Walker et al.
2001/0009865 A1 7/2001 Demar et al.
2001/0055990 A1 12/2001 Acres
2002/0028707 A1 3/2002 Pascal et al.
2002/0039923 A1 4/2002 Cannon et al.
2002/0086725 A1 7/2002 Fasbender et al.
2002/0132660 A1 9/2002 Taylor
2002/0151342 A1 10/2002 Tracy et al.
2002/0160825 A1 10/2002 Nicastro et al.
2002/0177483 A1 11/2002 Cannon
2003/0050111 A1 3/2003 Saffari
2003/0060264 A1 3/2003 Chilton et al.
2003/0114218 A1 6/2003 McClintic
2003/0130041 A1 7/2003 Pascal et al.
2003/0176219 A1 9/2003 Manfredi et al.
2003/0177347 A1 9/2003 Schneier et al.
2003/0186745 A1 10/2003 Nguyen et al.
2003/0190960 A1 10/2003 Jokipii et al.
2003/0199321 A1 10/2003 Williams
2004/0029631 A1 2/2004 Duhamel
2004/0132521 A1 7/2004 Peterson
2004/0142750 A1 7/2004 Glisson et al.
2004/0176167 A1 9/2004 Michaelson et al.
2004/0204226 A1 10/2004 Foster et al.
2004/0204243 A1 10/2004 de Mello Costa
2004/0224773 A1 11/2004 Sham
2004/0229700 A1 11/2004 Cannon et al.
2004/0242325 A1 12/2004 Levitan et al.
2004/0248652 A1 12/2004 Massey et al.
2004/0266533 A1 12/2004 Gentles et al.
2005/0005127 A1 1/2005 Rowe et al.
2005/0043088 A1 2/2005 Nguyen et al.
2005/0043089 A1 2/2005 Nguyen et al.
2005/0043094 A1 2/2005 Nguyen et al.
2005/0043072 A1 3/2005 Harada
2005/0054431 A1 3/2005 Walker et al.
2005/0071024 A1 3/2005 Henshaw
2005/0102047 A1 5/2005 Ottofy
2005/0148380 A1 7/2005 Cannon et al.
2005/0153760 A1 7/2005 Varley
2005/0159208 A1 7/2005 Pacey
2005/0170892 A1 8/2005 Atkinson
2005/0181856 A1 8/2005 Cannon et al.
2005/0192089 A1 9/2005 Blatter et al.
2005/0208989 A1 9/2005 Kane et al.
2005/0208992 A1 9/2005 Randall
2005/0215310 A1 9/2005 Boyd et al.
2005/0221882 A1 10/2005 Nguyen et al.
2005/0233794 A1 10/2005 Cannon et al.
2005/0236068 A1 10/2005 Jansheski
2005/0239539 A1 10/2005 Inamura
2005/0239542 A1 10/2005 Olsen
2005/0255919 A1 11/2005 Nelson
2005/0267610 A1 12/2005 Shinoda
2005/0278041 A1 12/2005 Bortnik et al.

(56) References Cited

U.S. PATENT DOCUMENTS

2005/0288101 A1 12/2005 Lockton et al.
2005/0288803 A1 12/2005 Ropp et al.
2006/0003835 A1 1/2006 Olive
2006/0019734 A1 1/2006 Roemer
2006/0019744 A1 1/2006 Roemer
2006/0030407 A1 2/2006 Thayer
2006/0030959 A1 2/2006 Duhamel
2006/0030960 A1 2/2006 Duhamel et al.
2006/0040735 A1 2/2006 Baerlocher
2006/0055113 A1 3/2006 Levi
2006/0058092 A1 3/2006 Crawford et al.
2006/0058097 A1 3/2006 Berman et al.
2006/0058103 A1 3/2006 Danieli et al.
2006/0063580 A1 3/2006 Nguyen et al.
2006/0082056 A1 4/2006 Kane et al.
2006/0089189 A1 4/2006 Harvey
2006/0105839 A1 5/2006 Graeve et al.
2006/0128453 A1 6/2006 Hoffman
2006/0128460 A1 6/2006 Muir et al.
2006/0128472 A1 6/2006 Beavers
2006/0135253 A1 6/2006 George et al.
2006/0136079 A1 6/2006 Stern
2006/0138728 A1 6/2006 Gordon et al.
2006/0148565 A1 7/2006 Gauselmann et al.
2006/0157934 A1 7/2006 Yoseloff et al.
2006/0160600 A1 7/2006 Hill et al.
2006/0160608 A1 7/2006 Hill et al.
2006/0161276 A1 7/2006 Soltani
2006/0165254 A1 7/2006 Fujimoto et al.
2006/0177109 A1 8/2006 Storch
2006/0178185 A1 8/2006 Weis
2006/0178202 A1 8/2006 Hughes et al.
2006/0183540 A1 8/2006 Grauzer et al.
2006/0202422 A1 9/2006 Bahar
2006/0214372 A1 9/2006 Picken
2006/0223638 A1 10/2006 Koyama et al.
2006/0226605 A1 10/2006 Kenny
2006/0229122 A1 10/2006 Macke
2006/0232012 A1 10/2006 Boyer
2006/0241795 A1 10/2006 Weingardt et al.
2006/0247012 A1 11/2006 Walker et al.
2006/0247955 A1 11/2006 Humphrey
2006/0252521 A1 11/2006 Gururajan et al.
2006/0252554 A1 11/2006 Gururajan et al.
2006/0258427 A1 11/2006 Rowe et al.
2006/0258442 A1 11/2006 Ryan
2006/0293099 A1 12/2006 Cooper
2007/0015587 A1 1/2007 Glisson et al.
2007/0060297 A1 3/2007 Hein et al.
2007/0087809 A1 4/2007 Baerlocher
2007/0087823 A1 4/2007 Walker et al.
2007/0090599 A1 4/2007 Hamilton
2007/0117621 A1 5/2007 Walker et al.
2007/0129147 A1 6/2007 Gagner
2007/0135950 A1 6/2007 Oliveras
2007/0135951 A1 6/2007 Romik et al.
2007/0155474 A1 7/2007 Gauselmann
2007/0167210 A1 7/2007 Kelly et al.
2007/0167239 A1 7/2007 O'Rourke
2007/0173318 A1 7/2007 Abbott
2007/0191101 A1 8/2007 Coliz et al.
2007/0218968 A1 9/2007 Snow et al.
2007/0243936 A1 10/2007 Binenstock et al.
2007/0259709 A1 11/2007 Kelly et al.
2008/0108411 A1 5/2008 Jensen et al.
2009/0011810 A1 1/2009 Moshal
2009/0042652 A1 2/2009 Baerlocher et al.
2009/0069071 A1 3/2009 Aoki et al.
2009/0088239 A1 4/2009 Iddings et al.
2009/0280904 A1 11/2009 Nicely et al.
2010/0120506 A1 5/2010 Davis et al.
2011/0077071 A1* 3/2011 Decasa .................. G07F 17/32 463/25
2011/0111826 A1 5/2011 Baerlocher et al.
2011/0118010 A1 5/2011 Brune
2011/0190044 A1 8/2011 Berman et al.
2011/0223984 A1 9/2011 Mizue
2011/0281626 A1 11/2011 Moody et al.
2012/0083327 A1 4/2012 Zobel et al.
2013/0079087 A1 3/2013 Brosnan et al.
2013/0102375 A1 4/2013 Aoki et al.
2013/0157733 A1 6/2013 Thorne et al.
2013/0217480 A1 8/2013 Decasa, Jr. et al.
2013/0252711 A1 9/2013 Dias Pires
2014/0011568 A1 1/2014 Berman et al.
2014/0256402 A1 9/2014 Caputo et al.

FOREIGN PATENT DOCUMENTS

CA 2527367 5/2007
CA 2527416 5/2007
EP 0 609 970 8/1994
EP 0 945 837 9/1999
EP 0 874 337 10/1999
EP 0 984 407 3/2000
EP 1 672 596 6/2006
GB 2 161 008 1/1986
WO WO 98/00210 1/1998
WO WO 98/51384 11/1998
WO WO 00/20082 4/2000
WO WO 01/91075 11/2001
WO WO 02/027676 4/2002
WO WO 02/094399 11/2002
WO WO 02/096528 12/2002
WO WO 2005/102480 11/2005
WO WO 2005/110563 11/2005
WO WO 2006/014833 2/2006
WO WO 2006/045113 4/2006
WO WO 2006/096752 9/2006
WO WO 2007/006002 1/2007
WO WO 2007/044785 4/2007

OTHER PUBLICATIONS

EZ-Pay and Related Brochures, written by IGT, published in Dec. 2000.
Gamblers Bonus Advertisement [online] [retrieved on Nov. 20, 2007]. Retrieved from the Internet at <URL: http:/ /www.gamblersbonus.com>.
Instant Slotto Article, written by Strictly Slots, published in Apr. 2001.
Reel 'Em In-Big Bass Bucks Article, published by Strictly Slots in Aug. 2005.
Silver Strike Advertisement and Pictures, written by Anchor Gaming, published in Dec. 1997.
Take Your Pick Article, written by Strictly Slots, published in Mar. 2001.
Tournamania Advertisement, written by Atronic Casino Technology, Ltd., published in 2005.
IGT Gaming Systems Brochure, written by IGT, published in 2002.
Global Player Casino Blackjack Game Rules Screen Shot [online] [retrieved on Apr. 1, 2008, publication date unknown]. Retrieved from the Internet at <URL: www.global-player.com>. (5 pages).
Golden Palace Multi Table Tournaments Game Description [online] [retrieved on Apr. 4, 2008, publication date unknown]. Retrieved from the Internet at <URL: http:/ /www.goldenpalacepoker.com/tournaments.html>. (13 pages).
InterCasino Blackjack Game Rules [online] [retrieved on Apr. 1, 2008, publication date unknown]. Retrieved from the Internet at <URL: http:/ /www.intercasino.com/games/blackjack/>. (8 pages).
InterCasino Craps Game Rules [online] [retrieved on Apr. 1, 2008, publication date unknown]. Retrieved from the Internet at <URL: http:/ /www.intercasino.com/games/craps/>. (10 pages).
InterCasino Multi Line Slots Game Rules [online] [retrieved on Apr. 2, 2008, publication date unknown]. Retrieved from the Internet at <URL: http:/ /www.intercasino.com/hlep/rules/multilineslots.shtml>. (49 pages).
InterCasino Roulette Game Rules [online] [retrieved on Apr. 1, 2008, publication date unknown]. Retrieved from the Internet at <URL: http:/ /www.intercasino.com/games/roulette/>. (7 pages).

(56) References Cited

OTHER PUBLICATIONS

InterCasino Slots Game Rules [online] [retrieved on Apr. 1, 2008, publication date unknown]. Retrieved from the Internet at <URL: http:/ /www.intercasino.com/games/slots/>. (13 pages).
InterCasino Tournaments Game Rules [online] [retrieved on Mar. 31, 2008, publication date unknown]. Retrieved from the Internet at <URL: http:/ /www.intercasino.com/help/rules/tournaments.shtml>. (5 pages).
Lasseters Aztec Game Rules [online] [retrieved on Apr. 2, 2008, publication date unknown]. Retrieved from the Internet at <URL: http:/ /www.lasseters.com/game/rules/las_aztec.jsp>. (3 pages).
Lasseters Hollywood Legends Game Rules [online] [retrieved on Apr. 2, 2008, publication date unknown]. Retrieved from the Internet at <URL: https:/ /austrust.lasseters.com.au/en/rules/help/html/HollywoodLegens.html>. (3 pages).
Lasseters Psychedelia Game Rules [online] [retrieved on Apr. 2, 2008, publication date unknown]. Retrieved from the Internet at <URL: https:/ /austrust.lasseters.com.au/en/rules/help/html/Psychedelia.html>. (3 pages).
Omni Casino Private Room Explanation [online] [retrieved on Apr. 2, 2008, publication date unknown]. Retrieved from the Internet at <URL: http:/ /www.omnicasino.com>. (1 page).
Omni Casino What is a Tournament? Explanation [online] [retrieved on Apr. 2, 2008, publication date unknown]. Retrieved from the Internet at <URL: http:/ /www.omnicasino.com>. (4 pages).
Parabol Casino Tournament Game Rules Screen Shot [online] [retrieved on Apr. 1, 2008, publication date unknown]. Retrieved from the Internet at <URL: www.parabolcasino.com>. (1 page).
Reviews on Tetris Deluxe (GB) at dooyoo.co.uk website (www.dooyoo.co.uk/gameboy-game/tetris-deluxe/reviews/, 9 pages).
Starluck.com World Slots Tournament Rules Screen Shots [online] [retrieved on Apr. 4, 2008, publication date unknown]. Retrieved from the Internet at <URL: www.starluck.com>. (2 pages).
Team Tiger News 2-Stage Freeroll Tournaments News Letter sent Apr. 19, 2004 from TigerGaming.com. (2 pages).
Team Tiger News "Winner Take All" Tournament News Letter Apr. 2004 from TigerGaming.com. (2 pages).
William Hill 3 Card Poker Game Rules [online] [retrieved on Apr. 1, 2008, publication date unknown]. Retrieved from the Internet at <URL: http:/ /www.williamhillcasino.com/rules_poker_3_card.htm>. (3 pages).
William Hill Multi-Hand Blackjack Game Rules [online] [retrieved on Apr. 1, 2008, publication date unknown]. Retrieved from the Internet at <URL: http:/ /www.williamhillcasino.com/rules_blackjack_multi-hand.htm>. (4 pages).
William Hill Multi-Player Blackjack Game Rules [online] [retrieved on Apr. 1, 2008, publication date unknown]. Retrieved from the Internet at <URL: http:/ /www.williamhillcasino.com/rules_blackjack_multi.htm>. (5 pages).
William Hill One Spin Wonder Roulette Game Rules [online] [retrieved on May 12, 2008, publication date unknown]. Retrieved from the Internet at <URL: http:/ /www.williamhillcasino.com>. (2 pages).
William Hill Single Player Blackjack/Multi-Split Blackjack Game Rules [online] [retrieved on Apr. 1, 2008, publication date unknown]. Retrieved from the Internet at <URL: http:/ /www.williamhillcasino.com/rules_blackjack_single.htm>.(4 pages).
William Hill Slots Game Rules [online] [retrieved on Apr. 1, 2008, publication date unknown]. Retrieved from the Internet at <URL: http:/ /www.williamhillcasino.com/rules_slots.htm>. (9 pages).
Raining Diamonds Advertisement, Sierra Design Group (2001).
Simon & Schuster, Scarne's New Complete Guide to Gambling (USA, 1974).

* cited by examiner

GAMING SYSTEM AND METHOD PROVIDING A GAMING TOURNAMENT HAVING A VARIABLE AVERAGE EXPECTED POINT PAYOUT

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the U.S. Patent and Trademark Office patent file or records, but otherwise reserves all copyright rights whatsoever.

BACKGROUND

Gaming tournaments are exciting for certain players and are a widely-used form of casino promotion. Generally, a gaming tournament is a group event that a plurality of players pay (or otherwise qualify) to join. During a typical gaming tournament, the tournament players play a tournament game on individual electronic gaming machines (EGMs) to try to win tournament points. The tournament game has a static average expected point payout that represents the quantity of tournament points, on average, a tournament player will win for a play of the tournament game. The tournament players accumulate tournament points when they achieve winning outcomes for their plays of the tournament games. The tournament player(s) who has accumulated the most tournament points at the end of the tournament is the tournament winner. Certain tournaments have multiple rounds. Players are eliminated from round to round (e.g., eliminating players who don't accumulate enough tournament points) until the tournament winner remains.

There is a continuing need to provide new and exciting gaming tournaments to increase player enjoyment, entertainment, and excitement.

SUMMARY

The present disclosure is directed to a gaming system and method providing a gaming tournament having a variable average expected point payout. Generally, during the gaming tournament, the gaming system enables each tournament player to play a tournament game at an EGM. The gaming system accumulates one or more tournament points for the tournament player when a play of the tournament game results in a winning outcome. At various points in time during the tournament, the gaming system increases or decreases an average expected point payout of the tournament game to change the tournament players' gaming experience.

This modification to the average expected point payout of the tournament game affects how many tournament points the player is likely to win, on average, for each play of the tournament game. Changing the average expected point payout of the tournament game during the tournament increases player enjoyment, entertainment, excitement, and anticipation. When the gaming system increases the average expected point payout of the tournament game, the players enjoy higher tournament point payouts and frenzied action. Conversely, when the gaming system decreases the average expected point payout of the tournament game, the players' anticipation levels rise as the players wait for the average expected point payout of the tournament game to increase.

More specifically, in one embodiment, the gaming system starts a gaming tournament for a plurality of tournament players. The gaming system enables each tournament player to play a tournament game on that tournament player's EGM. For each tournament player, for each play of the tournament game of that tournament player, the gaming system determines an outcome and determines and provides the tournament player any game award associated with the outcome. Each game award includes a quantity of one or more tournament points.

The gaming system monitors for the occurrence of any of a plurality of average expected point payout modification events and the occurrence of a tournament termination event. Until one of the average expected point payout modification events or the tournament termination occurs, the gaming system continues enabling each tournament player to play the tournament game on that tournament player's EGM.

Once the gaming system determines that one of the plurality of average expected point payout modification events occurs, the gaming system modifies (such as by increasing or decreasing) an average expected point payout of the tournament game. The gaming system then continues enabling each tournament player to play the tournament game (having the modified average expected point payout) on that tournament player's EGM.

Once the gaming system determines that the tournament termination event occurs, the gaming system stops enabling each tournament player to play the tournament game on that tournament player's EGM. The gaming system determines at least one tournament winner based on the quantities of tournament points the tournament players accumulated during the tournament. The gaming system provides a monetary tournament award to the at least one tournament winner, and ends the tournament.

Additional features and advantages are described herein, and will be apparent from, the following Detailed Description and the Figures.

DETAILED DESCRIPTION

Gaming Tournament Having a Variable Average Expected Point Payout

The present disclosure is directed to a gaming system and method providing a gaming tournament having a variable average expected point payout. Generally, during the gaming tournament, the gaming system enables each tournament player to play a tournament game at an EGM. The gaming system accumulates one or more tournament points for the tournament player when a play of the tournament game results in a winning outcome. At various points in time during the tournament, the gaming system increases or decreases an average expected point payout of the tournament game to change the tournament players' gaming experience.

Figure 1:
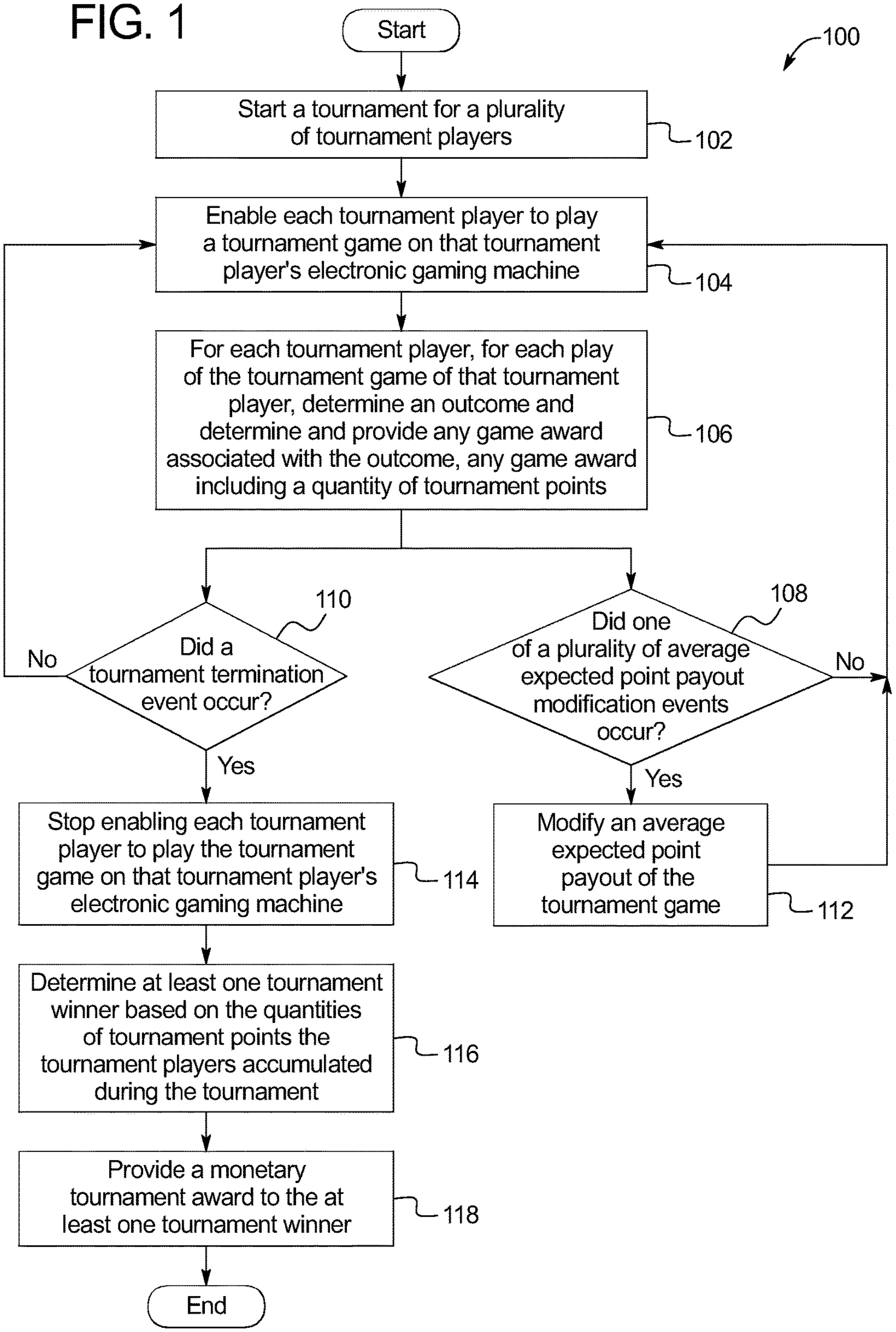
FIG. 1 is a flowchart of an example process or method of operating the gaming system of the present disclosure to provide a gaming tournament having a variable average expected point payout of the present disclosure.

FIG. 1 is a flowchart of an example process or method 100 of operating the gaming system of the present disclosure to provide a gaming tournament having a variable average expected point payout of the present disclosure. In various embodiments, the process 100 is represented by a set of instructions stored in one or more memories and executed by one or more processors. Although the process 100 is described with reference to the flowchart shown in FIG. 1, many other processes of performing the acts associated with this illustrated process 100 may be employed. For example, the order of certain of the illustrated blocks or diamonds may be changed, certain of the illustrated blocks or diamonds may be optional, or certain of the illustrated blocks or diamonds may not be employed.

In operation of this embodiment, the process 100 begins and the gaming system starts a gaming tournament for a plurality of tournament players, as indicated by block 102. The gaming system enables each tournament player to play a tournament game on that tournament player's EGM, as indicated by block 104. For each tournament player, for each play of the tournament game of that tournament player, the gaming system determines an outcome and determines and provides the tournament player any game award associated with the outcome, as indicated by block 106. Each game award includes a quantity of one or more tournament points.

The gaming system monitors for the occurrence of any of a plurality of average expected point payout modification events and the occurrence of a tournament termination event, as indicated by diamonds 108 and 110, respectively. If none of the plurality of average expected point payout modification events have occurred, the process 100 returns to block 104 and the gaming system continues enabling each tournament player to play the tournament game on that tournament player's EGM. Similarly, if the tournament termination event has not occurred, the process 100 returns to block 104 and the gaming system continues enabling each tournament player to play the tournament game on that tournament player's EGM.

If the gaming system determines at diamond 108 that one of the plurality of average expected point payout modification events occurs, the gaming system modifies an average expected point payout of the tournament game, as indicated by block 112. The process 100 then returns to block 104, and the gaming system continues enabling each tournament player to play the tournament game (with the modified average expected point payout) on that tournament player's EGM.

If the gaming system determines at diamond 110 that the tournament termination event occurs, the gaming system stops enabling each tournament player to play the tournament game on that tournament player's EGM, as indicated by block 114. The gaming system determines at least one tournament winner based on the quantities of tournament points the tournament players accumulated during the gaming tournament, as indicated by block 116. The gaming system provides a monetary tournament award to the at least one tournament winner, as indicated by block 118, and the process 100 ends.

1. Tournament Characteristics

Players may enter or qualify for the gaming tournament in any suitable manner, depending on the embodiment. In certain embodiments, if a player achieves a designated outcome during play of a primary game or a bonus game, the gaming system qualifies the player for the gaming tournament. In other embodiments, if a player achieves a particular score during play of a primary game or a bonus game, the gaming system qualifies the player for the gaming tournament. In various embodiments, the gaming system qualifies the player for the gaming tournament upon an occurrence of a bonus triggering event during play of a primary game. In certain embodiments, the gaming system qualifies a player for the gaming tournament after the player has played a particular game for a designated period of time. In other embodiments, the gaming system qualifies a player for the gaming tournament after the player has played any combination of games for a designated period of time. In various embodiments, the gaming system enables a player to win entry into the gaming tournament via bonus game play. That is, in these embodiments, entry into the gaming tournament is an award that the player can win via play of the bonus game. In certain embodiments, the gaming system enables a player to win entry into the gaming tournament via primary game play. That is, in these embodiments, entry into the gaming tournament is an award that the player can win via play of the primary game. In other embodiments, the gaming system only enables a player to win entry into the gaming tournament if the player has previously qualified for a different tournament. In certain embodiments, the gaming system enables a player to pay a fee to enter the gaming tournament (such as via an EGM, a kiosk, or a cashier or other casino employee). In various embodiments the gaming system enables a player to redeem a promotion the gaming establishment sent the player (e.g., via email, postal mail, or text message) to qualify for the gaming tournament.

In various embodiments, the gaming system only enables players to enter or qualify for the gaming tournament during a tournament qualification period. For example, the gaming system may only enable players to enter or qualify for the gaming tournament on a particular day or other period of time before the start of the gaming tournament.

In other embodiments, the gaming system qualifies a player for the gaming tournament based on one or more characteristics from the player's player tracking account. For instance, in one example embodiment, the gaming system qualifies all players having a particular player tracking rank or level (e.g., Platinum Level players) for the gaming tournament. In another example embodiment, the gaming system qualifies all players with newly-registered player tracking accounts for the gaming tournament. In another example embodiment, the gaming system qualifies a player for the gaming tournament on the player's birthday or anniversary of registering for her player tracking account. In another example embodiment in which a player accrues player tracking points through game play, the gaming system qualifies the player for the gaming tournament when the player's accrued player tracking point balance reaches one of a plurality of different threshold levels.

The above-described ways in which the gaming system may qualify a player for a tournament are merely examples, and the present disclosure contemplates any suitable manner of qualifying players, such as any of those described in U.S. Pat. Nos. 7,684,874 or 9,111,416, which are incorporated herein by reference.

The gaming system starts the gaming tournament upon an occurrence of a suitable tournament start event, such as the arrival of a particular date and time; the qualification of a designated quantity of players for the gaming tournament (e.g., a maximum quantity of players); a tournament award pool reaching a designated amount; or an occurrence of a triggering event during game play. These tournament start events are merely examples, and the present disclosure contemplates any suitable tournament start event, such as any of those described in U.S. Pat. Nos. 7,684,874 or 9,111,416, which are incorporated herein by reference.

The gaming system ends the gaming tournament upon an occurrence of a suitable tournament termination event, such as the elapsing of a designated period of time (e.g., a tournament that ends 60 minutes from when it starts); the tournament players having collectively completed a designated quantity of plays of the tournament game (e.g., a tournament that ends after the tournament players have collectively completed 10,000 plays of the tournament game); the occurrence of a designated outcome for a play of the tournament game (e.g., a tournament that ends when a play of the tournament game results in a jackpot outcome); or one tournament player accumulating a designated quantity of tournament points (e.g., a tournament that ends when one tournament player accumulates 1,000 tournament points). These tournament termination events are merely examples, and the present disclosure contemplates any suitable tournament termination event, such as any of those described in U.S. Pat. Nos. 7,684,874 or 9,111,416, which are incorporated herein by reference.

The tournament game may be any suitable game, such as a reel-based game, a card game (such as poker or blackjack), a keno game, a bingo game, or a roulette game. These tournament games are merely examples, and the present disclosure contemplates any suitable tournament games, such as any of those described in U.S. Pat. Nos. 7,684,874 or 9,111,416, which are incorporated herein by reference.

In certain embodiments, the average expected point payout for the tournament game is the same for all tournament players, both initially and after being modified. In various embodiments, the gaming system may modify the average expected point payout of the tournament game for different players at different times during the tournament while ensuring that the overall average expected point payout is the same for all players over the course of the entire tournament. In certain embodiments, the gaming system increases the average expected point payout for players lagging behind others to enable those players to catch up and keep the tournament competitive. In various embodiments, the gaming system temporarily increases the average expected point payout for a player when the player meets a certain condition.

The actual point payout for the tournament game may, however, differ among players. Certain players may play a "hot" EGM that pays many high awards while others may not.

In other embodiments, the average expected point payout for the tournament game may differ for different players of the same tournament.

The gaming system may determine the tournament winner in any suitable manner. In certain embodiments in which the gaming tournament has a single tournament winner, the gaming system designates the player who accumulated the most tournament points during the gaming tournament as the tournament winner. In other embodiments in which the gaming tournament has a designated quantity of tournament winners, the gaming system ranks the tournament players according to how many tournament points the players have accumulated, and selects the designated quantity of tournament players atop the list (i.e., having the most accumulated tournament points). These ways to determine the tournament winner(s) are merely examples, and the present disclosure contemplates any suitable ways to determine the tournament winner(s), such as any of those described in U.S. Pat. Nos. 7,684,874 or 9,111,416, which are incorporated herein by reference.

The tournament award may be any suitable award, such as: (1) monetary credits or currency; (2) non-monetary credits or currency; (3) a modifier (e.g., a multiplier) used to modify one or more awards; (4) one or more free plays of a game; (5) one or more plays of a bonus game (e.g., a free spin of an award wheel); (6) one or more lottery based awards (e.g., one or more lottery or drawing tickets); (7) a wager match for one or more plays of the a wagering game; (8) an increase in an average expected payback percentage of a bonus game and/or an average expected payback percentage of a primary game for one or more plays; (9) one or more comps (such as a free meal or a free night's stay at a hotel); (10) one or more bonus or promotional credits usable for online play; (11) one or more player tracking points; (12) a multiplier for player tracking points; (13) an increase in a membership or player tracking level; (14) one or more coupons or promotions usable within a gaming establishment or outside of the gaming establishment (e.g., a 20% off coupon for use at a retail store or a promotional code providing a deposit match for use at an online casino); (15) an access code usable to unlock content on the Internet; (16) a progressive award; (17) a high value product or service (such as a car); and/or (18) a low value product or service (such as a teddy bear).

The above-listed tournament awards are merely examples, and the present disclosure contemplates any suitable tournament awards, such as any of those described in U.S. Pat. Nos. 7,684,874 or 9,111,416, which are incorporated herein by reference.

2. Average Expected Point Payout Modification Events

An average expected point payout modification event may be any suitable event, such as but not limited to: (1) the expiration of a designated period of time following the start of the gaming tournament (e.g., the expiration of the first 10 minutes of the gaming tournament, the expiration of the second 10 minutes of the gaming tournament, and so on); (2) the occurrence of a triggering event during tournament game play (e.g., a play of the tournament game resulting in a particular outcome); (3) the tournament players having collectively completed a designated quantity of plays of the tournament game (e.g., the tournament players having collectively completed 10,000 plays of the tournament game); (4) a single tournament player having completed a designated quantity of plays of the tournament game (e.g., one tournament player having completed 250 plays of the tournament game); (5) the tournament players having collectively accumulated a designated quantity of tournament points during the gaming tournament (e.g., the tournament players having collectively accumulated 100,000 tournament points during the gaming tournament); (6) a tournament player having accumulated a designated quantity of tournament points during the gaming tournament (e.g., one tournament player having accumulated 5,000 tournament points during the gaming tournament); (7) the occurrence of a particular time (e.g., 5:00 PM); (8) the occurrence of a particular date and time (e.g., July 4 at Noon); (9) a random mystery event; (10) a tournament operator-initiated event; or (11) any combination thereof. Multiple different average expected point payout modification events may occur during a single tournament.

Each average expected point payout modification event is associated with a tournament game modification. When an average expected point payout modification event occurs, the gaming system implements the tournament game modification associated with that average expected point payout modification event. Implementing the tournament game modification changes (i.e., increases or decreases) the current average expected point payout of the tournament game. Different example ways of modifying the tournament game to change the average expected point payout are described below in Section 3.

In certain embodiments, an average expected point payout event is associated with a plurality of different tournament game modifications rather than a single tournament game modification. In one of these embodiments, when the average expected point payout event occurs, the gaming system determines one of the tournament game modifications and modifies the tournament according to that particular tournament game modification. In another of these embodiments, when the average expected point payout event occurs, the gaming system modifies the tournament according to all of those particular tournament game modifications Certain tournament game modifications last for a designated period, such as a designated period of time or a designated quantity of plays of the tournament game. Other tournament game modifications last until another average expected point payout modification event occurs. Other tournament game modifications last for a designated period or until another average expected point payout modification event occurs, whichever happens first. Some tournament game modifications last for a randomly-determined period of time.

The gaming tournament may include any suitable quantity of one or more average expected point payout modification events. In certain embodiments including multiple average expected point payout modification events, any average expected point payout modification event can occur at any time. In other embodiments including multiple average expected point payout modification events, the average expected point payout modification events must occur according to a particular order such that only one average expected point payout modification event can occur at any given point in time.

For certain average expected point payout modification events, once that average expected point payout modification event occurs, that average expected point payout modification event cannot occur again during the tournament. For other average expected point payout modification events, that average expected point payout modification event can occur up to a designated quantity of one or more times during the tournament. For other average expected point payout modification events, those average expected point payout modification event can occur an unlimited quantity of times during the tournament.

3. Modifying the Average Expected Point Payout of the Tournament Game

As mentioned above, each average expected point payout modification event is associated with a tournament game modification. When an average expected point payout modification event occurs, the gaming system implements the tournament game modification associated with that average expected point payout modification event. Certain examples of how the gaming system modifies the tournament game's average expected point payout after the occurrences of certain average expected point payout modification events are described below. There are merely examples, and the present disclosure contemplates any other suitable ways of modifying the average expected point payout of the tournament game.

3.1 Increasing the Average Expected Point Payout of a Five-Card Draw Poker Tournament Game by Selecting Better Initial Hands as the Gaming Tournament Progresses In certain embodiments, the tournament game is a five-card draw poker game and the gaming system increases the average expected point payout of the five-card draw poker tournament game by selecting better initial hands as the gaming tournament progresses.

A play of this five-card draw poker tournament game (before any modification of the average expected point payout) generally proceeds as follows:

1) the EGM randomly selects an initial hand of five cards from a 52-card virtual deck of standard playing cards;
2) the EGM displays the five cards of the initial hand face-up;
3) the EGM enables the player to select up to five cards of the initial hand to hold;
4) if the EGM receives a hold input for all five cards, the EGM finalizes the hand, determines a poker ranking of the final hand, and determines and provides any game awards based on the final hand's poker ranking; and
5) if the EGM receives a hold input for fewer than all five cards, the EGM discards each non-held card, replaces each discarded card with a randomly-selected one of the remaining cards in the virtual deck to finalize the hand, determines a poker ranking of the final hand, and determines and provides any game awards based on the final hand's poker ranking.

In these embodiments, the gaming system increases the average expected point payout of the five-card draw poker tournament game by selecting better initial hands as the gaming tournament progresses. In other words, after a certain point in time during the gaming tournament, rather than randomly selecting the initial hand of five cards, the gaming system selects all five cards of the initial hand such that the initial hand includes at least one random card and two or more cards associated with a particular poker ranking. For example, after a certain point in time, each initial hand for a play of the five-card draw poker tournament game includes four cards to a Royal Flush (e.g., A♥, K♥, Q♥, and J♥) and one random card. This increases the average expected point payout of this play of the five-card draw poker tournament game because it significantly increases the player's odds of hitting the Royal Flush (as compared to a randomly-selected initial five card hand).

Table 1 below illustrates an example embodiment in which the gaming system randomly selects the player's initial five-card hand at the outset of the gaming tournament and, as the gaming tournament progresses, selects better initial five-card hands. This example embodiment includes five average expected point payout modification events (for a 60 minute tournament): (1) a first average expected point payout modification event that occurs 10 minutes after the start of the gaming tournament, (2) a second average expected point payout modification event that occurs 20 minutes after the start of the gaming tournament, (3) a third average expected point payout modification event that occurs 30 minutes after the start of the gaming tournament, (4) a fourth average expected point payout modification event that occurs 40 minutes after the start of the gaming tournament, and (5) a fifth average expected point payout modification event that occurs 50 minutes after the start of the gaming tournament.

When the first average expected point payout modification event occurs, the gaming system modifies the tournament game such that each subsequent initial hand until the second average expected point payout modification event occurs includes a matching Pair of cards and three randomly-determined cards.

When the second average expected point payout modification event occurs, the gaming system modifies the tournament game such that each subsequent initial hand until the third average expected point payout modification event occurs includes four cards to a Straight and one randomly-determined card.

When the third average expected point payout modification event occurs, the gaming system modifies the tournament game such that each subsequent initial hand until the fourth average expected point payout modification event occurs includes four cards to a Flush and one randomly-determined card.

When the fourth average expected point payout modification event occurs, the gaming system modifies the tournament game such that each subsequent initial hand until the fifth average expected point payout modification event occurs includes two matching Pairs of cards (i.e., four cards to a Full House) and one randomly-determined card.

When the fifth average expected point payout modification event occurs, the gaming system modifies the tournament game such that each subsequent initial hand until the gaming tournament ends includes four cards to a Royal Flush and one randomly-determined card.

This is merely one example embodiment. The gaming system may provide any suitable initial hands following the occurrences of the average expected point payout modification events to increase the average expected point payout of the tournament game by any suitable amount.

TABLE 1

| Initial hand | Timeframe of 60 minute gaming tournament |
|---|---|
| 5 random cards | 0 to 10 minutes |
| Pair + 3 random cards | 11 to 20 minutes |
| 4 cards to a Straight + 1 random card | 21 to 30 minutes |
| 4 cards to a Flush + 1 random card | 31 to 40 minutes |
| 2 Pair + 1 random card | 41 to 50 minutes |
| 4 cards to a Royal Flush + 1 random card | 51 to 60 minutes |

This concept may be used for other games as well. For example, in one embodiment, the tournament game is a spinning-reel type game and the gaming system increases the average expected point payout of the spinning-reel type tournament game by using more lucrative reel sets as the tournament progresses and average expected point payout modification events occur. In another example embodiment, the tournament game is a keno game and the gaming system increases the average expected point payout of the keno tournament game by enabling the player to choose more numbers as the tournament progresses and average expected point payout modification events occur.

3.2 Increasing the Average Expected Point Payout of a Tournament Game by Randomly Providing Multipliers for Plays of the Tournament Game In certain embodiments, gaming system increases the average expected point payout of a tournament game by randomly providing multipliers for plays of the tournament game. The gaming system uses a provided multiplier to modify any game award (i.e., quantity of tournament points) won for that play of the tournament game.

In one embodiment, there is only one multiplier—referred to as a designated multiplier—that the gaming system can randomly provide during the gaming tournament. In this embodiment, the probability of providing the designated multiplier for a play of the tournament game increases as the gaming tournament progresses. Thus, in this embodiment, if the gaming system randomly determines (based on the appropriate probability of providing the designated multiplier at that time) to provide the designated multiplier for a play of the tournament game, the gaming system uses the designated multiplier to modify any game awards for that play.

Table 2 below illustrates an example embodiment in which the gaming system can randomly provide a 5× multiplier during a tournament and the probability of providing the 5× multiplier for a play of the tournament game increases from a minimum of 0% to a maximum of 75% as the gaming tournament progresses. This example embodiment includes five average expected point payout modification events: (1) a first average expected point payout modification event that occurs 10 minutes after the start of the gaming tournament, (2) a second average expected point payout modification event that occurs 20 minutes after the start of the gaming tournament, (3) a third average expected point payout modification event that occurs 30 minutes after the start of the gaming tournament, (4) a fourth average expected point payout modification event that occurs 40 minutes after the start of the gaming tournament, and (5) a fifth average expected point payout modification event that occurs 50 minutes after the start of the gaming tournament.

Initially, the gaming system cannot provide the 5× multiplier. That is, the gaming system has a 0% chance of providing the 5× multiplier for a play of the tournament game.

When the first average expected point payout modification event occurs, the gaming system modifies the tournament game such that, for each subsequent play of the tournament game until the second average expected point payout modification event occurs, the gaming system has a 15% chance of providing the 5× multiplier.

When the second average expected point payout modification event occurs, the gaming system modifies the tournament game such that, for each subsequent play of the tournament game until the third average expected point payout modification event occurs, the gaming system has a 30% chance of providing the 5× multiplier.

When the third average expected point payout modification event occurs, the gaming system modifies the tournament game such that, for each subsequent play of the tournament game until the fourth average expected point payout modification event occurs, the gaming system has a 45% chance of providing the 5× multiplier.

When the fourth average expected point payout modification event occurs, the gaming system modifies the tournament game such that, for each subsequent play of the tournament game until the fifth average expected point payout modification event occurs, the gaming system has a 60% chance of providing the 5× multiplier.

When the fifth average expected point payout modification event occurs, the gaming system modifies the tournament game such that, for each subsequent play of the tournament game until the gaming tournament ends, the gaming system has a 75% chance of providing the 5× multiplier.

This is merely one example embodiment. The multiplier may have any suitable value, the probabilities may be any suitable values, and the average expected point payout modification events may be any suitable events.

TABLE 2

| Probability of providing a multiplier for a play of the tournament game | Multiplier | Timeframe of 60 minute gaming tournament |
|---|---|---|
| 0% | n/a | 0 to 10 minutes |
| 15% | 5× | 11 to 20 minutes |
| 30% | 5× | 21 to 30 minutes |
| 45% | 5× | 31 to 40 minutes |
| 60% | 5× | 41 to 50 minutes |
| 75% | 5× | 51 to 60 minutes |

In another embodiment, the probability of providing a multiplier does not change throughout the gaming tournament. There are, however, a plurality of different available multipliers, and the probability that the gaming system will select larger multipliers increases as the gaming tournament progresses. Thus, in this embodiment, if the gaming system randomly determines (based on the static probability of providing a multiplier) to provide a multiplier for a play of the tournament game, the gaming system randomly selects one of the plurality of multipliers (based on the probabilities of being selected associated with the multipliers at that time) and uses the selected multiplier to modify any game awards for that play.

Table 3 below illustrates an example embodiment in which the probability of providing a multiplier is 15%, the largest multiplier's probability of being selected increases from 0% to 75% as the gaming tournament progresses, and the smallest multiplier's probability of being selected decreases from 100% to 5% as the gaming tournament progresses. This example embodiment includes five average expected point payout modification events: (1) a first average expected point payout modification event that occurs 10 minutes after the start of the gaming tournament, (2) a second average expected point payout modification event that occurs 20 minutes after the start of the gaming tournament, (3) a third average expected point payout modification event that occurs 30 minutes after the start of the gaming tournament, (4) a fourth average expected point payout modification event that occurs 40 minutes after the start of the gaming tournament, and (5) a fifth average expected point payout modification event that occurs 50 minutes after the start of the gaming tournament.

Initially, if the gaming system determines to provide a multiplier, the gaming system provides the 2× multiplier. That is, the gaming system has a 100% chance of providing the 2× multiplier if it determines to provide a multiplier for a play of the tournament game.

When the first average expected point payout modification event occurs, the gaming system modifies the tournament game such that, for each subsequent play of the tournament game until the second average expected point payout modification event occurs, if the gaming system determines to provide a multiplier, the gaming system has a 75% chance of selecting the 2× multiplier, a 20% chance of selecting the 3× multiplier, and a 5% chance of selecting the 5× multiplier.

When the second average expected point payout modification event occurs, the gaming system modifies the tournament game such that, for each subsequent play of the tournament game until the third average expected point payout modification event occurs, if the gaming system determines to provide a multiplier, the gaming system has a 50% chance of selecting the 2× multiplier, a 35% chance of selecting the 3× multiplier, and a 15% chance of selecting the 5× multiplier.

When the third average expected point payout modification event occurs, the gaming system modifies the tournament game such that, for each subsequent play of the tournament game until the fourth average expected point payout modification event occurs, if the gaming system determines to provide a multiplier, the gaming system has a 25% chance of selecting the 2× multiplier, a 50% chance of selecting the 3× multiplier, and a 25% chance of selecting the 5× multiplier.

When the fourth first average expected point payout modification event occurs, the gaming system modifies the tournament game such that, for each subsequent play of the tournament game until the fifth average expected point payout modification event occurs, if the gaming system determines to provide a multiplier, the gaming system has a 15% chance of selecting the 2× multiplier, a 35% chance of selecting the 3× multiplier, and a 50% chance of selecting the 5× multiplier.

When the fifth average expected point payout modification event occurs, the gaming system modifies the tournament game such that, for each subsequent play of the tournament game until the gaming tournament ends, if the gaming system determines to provide a multiplier, the gaming system has a 5% chance of selecting the 2× multiplier, a 20% chance of selecting the 3× multiplier, and a 75% chance of selecting the 5× multiplier.

This is merely one example embodiment. The multipliers may have any suitable values, the probabilities may be any suitable values, and the average expected point payout modification events may be any suitable events.

TABLE 3

| Probability of providing a multiplier for a play of the tournament game | Probability of multiplier being selected | Timeframe of 60 minute gaming tournament |
|---|---|---|
| 15% | 2×-100% | 0 to 10 minutes |
| 15% | 2×-75%<br>3×-20%<br>5×-5% | 11 to 20 minutes |
| 15% | 2×-50%<br>3×-35%<br>5×-15% | 21 to 30 minutes |
| 15% | 2×-25%<br>3×-50%<br>5×-25% | 31 to 40 minutes |
| 15% | 2×-15%<br>3×-35%<br>5×-50% | 41 to 50 minutes |
| 15% | 2×-5%<br>3×-20%<br>5×-75% | 51 to 60 minutes |

In another embodiment, the probability of providing a multiplier increases as the gaming tournament progresses. In this embodiment, there are a plurality of different available multipliers, and the probability that the gaming system will select larger multipliers increases as the gaming tournament progresses. Thus, in this embodiment, if the gaming system randomly determines (based on the appropriate probability of providing a multiplier at that time) to provide a multiplier for a play of the tournament game, the gaming system randomly selects one of the plurality of multipliers (based on the probabilities of being selected associated with the multipliers at that time) and uses the selected multiplier to modify any game awards for that play.

Table 4 below illustrates an example embodiment in which the probability of providing a multiplier increases from 0% to 75% as the gaming tournament progresses, the largest multiplier's probability of being selected increases from 0% to 75% as the gaming tournament progresses, and the smallest multiplier's probability of being selected decreases from 100% to 5% as the gaming tournament progresses. This example embodiment includes five average expected point payout modification events: (1) a first average expected point payout modification event that occurs 10 minutes after the start of the gaming tournament, (2) a second average expected point payout modification event that occurs 20 minutes after the start of the gaming tournament, (3) a third average expected point payout modification event that occurs 30 minutes after the start of the gaming tournament, (4) a fourth average expected point payout modification event that occurs 40 minutes after the start of the gaming tournament, and (5) a fifth average expected point payout modification event that occurs 50 minutes after the start of the gaming tournament.

Initially, the gaming system cannot provide a multiplier for a play of the tournament game. That is, the gaming system has a 0% chance of providing a multiplier for a play of the tournament game.

When the first average expected point payout modification event occurs, the gaming system modifies the tournament game such that, for each subsequent play of the tournament game until the second average expected point payout modification event occurs, the gaming system has a 15% chance of providing a multiplier and, if the gaming system determines to provide a multiplier, the gaming system has a 75% chance of selecting the 2× multiplier, a 20% chance of selecting the 3× multiplier, and a 5% chance of selecting the 5× multiplier.

When the second average expected point payout modification event occurs, the gaming system modifies the tournament game such that, for each subsequent play of the tournament game until the third average expected point payout modification event occurs, the gaming system has a 30% chance of providing a multiplier and, if the gaming system determines to provide a multiplier, the gaming system has a 50% chance of selecting the 2× multiplier, a 35% chance of selecting the 3× multiplier, and a 15% chance of selecting the 5× multiplier.

When the third average expected point payout modification event occurs, the gaming system modifies the tournament game such that, for each subsequent play of the tournament game until the fourth average expected point payout modification event occurs, the gaming system has a 45% chance of providing a multiplier and, if the gaming system determines to provide a multiplier, the gaming system has a 25% chance of selecting the 2× multiplier, a 50% chance of selecting the 3× multiplier, and a 25% chance of selecting the 5× multiplier.

When the fourth average expected point payout modification event occurs, the gaming system modifies the tournament game such that, for each subsequent play of the tournament game until the fifth average expected point payout modification event occurs, the gaming system has a 60% chance of providing a multiplier and, if the gaming system determines to provide a multiplier, the gaming system has a 15% chance of selecting the 2× multiplier, a 35% chance of selecting the 3× multiplier, and a 50% chance of selecting the 5× multiplier.

When the fifth average expected point payout modification event occurs, the gaming system modifies the tournament game such that, for each subsequent play of the tournament game until the gaming tournament ends, the gaming system has a 75% chance of providing a multiplier and, if the gaming system determines to provide a multiplier, the gaming system has a 5% chance of selecting the 2× multiplier, a 20% chance of selecting the 3× multiplier, and a 75% chance of selecting the 5× multiplier.

This is merely one example embodiment. The multiplier may have any suitable value, the probabilities may be any suitable values, and the average expected point payout modification events may be any suitable events.

TABLE 4

| Probability of providing a multiplier for a play of the tournament game | Probability of multiplier being selected | Timeframe of 60 minute gaming tournament |
|---|---|---|
| 0% | n/a | 0 to 10 minutes |
| 15% | 2x-75%<br>3x-20%<br>5x-5% | 11 to 20 minutes |
| 30% | 2x-50%<br>3x-35%<br>5x-15% | 21 to 30 minutes |
| 45% | 2x-25%<br>3x-50%<br>5x-25% | 31 to 40 minutes |
| 60% | 2x-15%<br>3x-35%<br>5x-50% | 41 to 50 minutes |
| 75% | 2x-5%<br>3x-20%<br>5x-75% | 51 to 60 minutes |

3.3 Increasing the Average Expected Point Payout of a Five-Card Draw Poker Tournament Game by Internally Selecting a Plurality of Initial Hands and Dealing the Tournament Player the Best of the Plurality of Initial Hands In certain embodiments, the tournament game is a five-card draw poker game and the gaming system increases the average expected point payout of the five-card draw poker tournament game by internally selecting a plurality of initial hands and dealing the player the best of the plurality of initial hands.

A play of this five-card draw poker tournament game (before any modification of the average expected point payout) generally proceeds as follows:

1) the EGM randomly selects an initial hand of five cards from a 52 card virtual deck of standard playing cards (the virtual deck may include any suitable quantity of cards);
2) the EGM displays the five cards of the initial hand face-up;
3) the EGM enables the player to select up to five cards of the initial hand to hold;
4) if the EGM receives a hold input for all five cards, the EGM finalizes the hand, determines a poker ranking of the final hand, and determines and provides any game awards based on the final hand's poker ranking; and
5) if the EGM receives a hold input for fewer than all five cards, the EGM discards each non-held card, replaces each discarded card with a randomly-selected one of the remaining cards in the virtual deck to finalize the hand, determines a poker ranking of the final hand, and determines and provides any game awards based on the final hand's poker ranking.

In these embodiments, the gaming system increases the average expected point payout of the five-card draw poker tournament game by, for each play of the five-card draw poker tournament game following an occurrence of an average expected point payout modification event: (1) internally selecting two or more initial hands from different 52-card virtual decks of standard cards, (2) determining which of the two or more initial hands has a highest expected point value, and (3) dealing the tournament player the initial hand having the highest expected point value. Play then proceeds as described above. Increasing the pool of hands from which the gaming system selects the best hand to deal to the tournament player will, over time, statistically give the tournament player better winning hands than if the gaming system simply provided the player the first-selected initial hand.

Table 5 below illustrates an example embodiment in which the quantity of hands the gaming system internally selects—and from which the gaming system selects and deals the initial hand to the tournament player—increases as the gaming tournament progresses. This example embodiment includes five average expected point payout modification events: (1) a first average expected point payout modification event that occurs 10 minutes after the start of the gaming tournament, (2) a second average expected point payout modification event that occurs 20 minutes after the start of the gaming tournament, (3) a third average expected point payout modification event that occurs 30 minutes after the start of the gaming tournament, (4) a fourth average expected point payout modification event that occurs 40 minutes after the start of the gaming tournament, and (5) a fifth average expected point payout modification event that occurs 50 minutes after the start of the gaming tournament.

Initially, as described above, the gaming system internally selects a single initial hand and provides the player that initial hand as the player's initial hand.

When the first average expected point payout modification event occurs, the gaming system modifies the tournament game such that, for each subsequent play of the tournament game until the second average expected point payout modification event occurs, the gaming system internally selects two initial hands and provides the best of the two initial hands to the player as the player's initial hand.

When the second average expected point payout modification event occurs, the gaming system modifies the tournament game such that, for each subsequent play of the tournament game until the third average expected point payout modification event occurs, the gaming system internally selects five initial hands and provides the best of the five initial hands to the player as the player's initial hand.

When the third average expected point payout modification event occurs, the gaming system modifies the tournament game such that, for each subsequent play of the tournament game until the fourth average expected point payout modification event occurs, the gaming system internally selects ten initial hands and provides the best of the ten initial hands to the player as the player's initial hand.

When the fourth average expected point payout modification event occurs, the gaming system modifies the tournament game such that, for each subsequent play of the tournament game until the fifth average expected point payout modification event occurs, the gaming system internally selects fifteen initial hands and provides the best of the fifteen initial hands to the player as the player's initial hand.

When the fifth average expected point payout modification event occurs, the gaming system modifies the tournament game such that, for each subsequent play of the tournament game until the gaming tournament ends, the gaming system internally selects twenty initial hands and provides the best of the twenty initial hands to the player as the player's initial hand.

This is merely one example embodiment. The quantities of internally-selected initial hands may be any suitable quantities and the average expected point payout modification events may be any suitable events.

TABLE 5

| Quantity of internally-selected initial hands | Timeframe of 60 minute gaming tournament |
|---|---|
| 1 | 0 to 10 minutes |
| 2 | 11 to 20 minutes |
| 5 | 21 to 30 minutes |
| 10 | 31 to 40 minutes |
| 15 | 41 to 50 minutes |
| 20 | 51 to 60 minutes |

In other embodiments, instead of (or in addition to) internally selecting a quantity of initial hands, when the player discards a card, the gaming system internally selects a quantity of replacement cards and chooses the best of those replacement cards to replace the discarded card.

This concept may be used for other games as well. For example, in one embodiment, the tournament game is a spinning-reel type game and the gaming system increases the average expected point payout of the spinning-reel type tournament game by internally conducting a plurality of reel spins and displaying to the player the best of the plurality of reel spins (i.e., the one the results in the player winning the most tournament points). In another example embodiment, the tournament game is a keno game and the gaming system increases the average expected point payout of the keno tournament game by internally conducting a plurality of number draws and displaying to the player the best of the plurality of number draws (i.e., the one that results in the player winning the most tournament points).

3.4 Increasing the Average Expected Point Payout of a Tournament Game by Randomly Providing Tournament Point Awards In certain embodiments, gaming system increases the average expected point payout of a tournament game by randomly providing tournament point awards. The gaming system randomly provides the tournament point awards independent of the tournament games that the player plays. Put differently, whether the gaming system randomly provides a player a tournament point award is not based on any event that occurs during the tournament player's play(s) of the tournament game.

In one embodiment, there is only one tournament point award—referred to as the designated tournament point award—that the gaming system can randomly provide during the gaming tournament. In this embodiment, the probability of providing the designated tournament point award increases as the gaming tournament progresses. Thus, in this embodiment, if the gaming system randomly determines (based on the appropriate probability of providing the designated tournament point award at that time) to provide the designated tournament point award, the gaming system provides the designated tournament point award.

Table 6 below illustrates an example embodiment in which the gaming system can randomly provide a 50 tournament point award during a tournament and the probability of providing the 50 tournament point award increases from a minimum of 0% to a maximum of 75% as the gaming tournament progresses. This example embodiment includes five average expected point payout modification events: (1) a first average expected point payout modification event that occurs 10 minutes after the start of the gaming tournament, (2) a second average expected point payout modification event that occurs 20 minutes after the start of the gaming tournament, (3) a third average expected point payout modification event that occurs 30 minutes after the start of the gaming tournament, (4) a fourth average expected point payout modification event that occurs 40 minutes after the start of the gaming tournament, and (5) a fifth average expected point payout modification event that occurs 50 minutes after the start of the gaming tournament.

Initially, the gaming system cannot provide the 50 tournament point award. That is, the gaming system has a 0% chance of providing the 50 tournament point award.

When the first average expected point payout modification event occurs, the gaming system modifies the tournament game such that, until the second average expected point payout modification event occurs, the gaming system has a 15% chance of providing the 50 tournament point award.

When the second average expected point payout modification event occurs, the gaming system modifies the tournament game such that, until the third average expected point payout modification event occurs, the gaming system has a 30% chance of providing the 50 tournament point award.

When the third average expected point payout modification event occurs, the gaming system modifies the tournament game such that, until the fourth average expected point payout modification event occurs, the gaming system has a 45% chance of providing the 50 tournament point award.

When the fourth average expected point payout modification event occurs, the gaming system modifies the tournament game such that, until the fifth average expected point payout modification event occurs, the gaming system has a 60% chance of providing the 50 tournament point award.

When the fifth average expected point payout modification event occurs, the gaming system modifies the tournament game such that, until the tournament ends, the gaming system has a 75% chance of providing the 50 tournament point award.

This is merely one example embodiment. The tournament point award may have any suitable value, the probabilities may be any suitable values, and the average expected point payout modification events may be any suitable events.

TABLE 6

| Probability of providing a tournament point award for a play of the tournament game | Tournament point award | Timeframe of 60 minute gaming tournament |
|---|---|---|
| 0% | n/a | 0 to 10 minutes |
| 15% | 50 | 11 to 20 minutes |
| 30% | 50 | 21 to 30 minutes |
| 45% | 50 | 31 to 40 minutes |
| 60% | 50 | 41 to 50 minutes |
| 75% | 50 | 51 to 60 minutes |

In another embodiment, the probability of providing a tournament point award does not change throughout the gaming tournament. There are, however, a plurality of different available tournament point awards, and the probability that the gaming system will select larger tournament point awards increases as the gaming tournament progresses. Thus, in this embodiment, if the gaming system randomly determines (based on the static probability of providing a tournament point award) to provide a tournament point award, the gaming system randomly selects one of the plurality of tournament point awards (based on the probabilities of being selected associated with the tournament point awards at that time) and provides the selected tournament point award.

Table 7 below illustrates an example embodiment in which the probability of providing a tournament point award is 15%, the largest tournament point award's probability of being selected increases from 0% to 75% as the gaming tournament progresses, and the smallest tournament point award's probability of being selected decreases from 100% to 5% as the gaming tournament progresses. This example embodiment includes five average expected point payout modification events: (1) a first average expected point payout modification event that occurs 10 minutes after the start of the gaming tournament, (2) a second average expected point payout modification event that occurs 20 minutes after the start of the gaming tournament, (3) a third average expected point payout modification event that occurs 30 minutes after the start of the gaming tournament, (4) a fourth average expected point payout modification event that occurs 40 minutes after the start of the gaming tournament, and (5) a fifth average expected point payout modification event that occurs 50 minutes after the start of the gaming tournament.

Initially, if the gaming system determines to provide a tournament point award, the gaming system provides the 20 tournament point award. That is, the gaming system has a 100% chance of providing the 20 tournament point award if it determines to provide a tournament point award.

When the first average expected point payout modification event occurs, the gaming system modifies the tournament game such that, until the second average expected point payout modification event occurs, if the gaming system determines to provide a tournament point award, the gaming system has a 75% chance of selecting the 20 tournament point award, a 20% chance of selecting the 30 tournament point award, and a 5% chance of selecting the 50 tournament point award.

When the second average expected point payout modification event occurs, the gaming system modifies the tournament game such that, until the third average expected point payout modification event occurs, if the gaming system determines to provide a tournament point award, the gaming system has a 50% chance of selecting the 20 tournament point award, a 35% chance of selecting the 30 tournament point award, and a 15% chance of selecting the 50 tournament point award.

When the third average expected point payout modification event occurs, the gaming system modifies the tournament game such that, until the fourth average expected point payout modification event occurs, if the gaming system determines to provide a tournament point award, the gaming system has a 25% chance of selecting the 20 tournament point award, a 50% chance of selecting the 30 tournament point award, and a 25% chance of selecting the 50 tournament point award.

When the fourth first average expected point payout modification event occurs, the gaming system modifies the tournament game such that, until the fifth average expected point payout modification event occurs, if the gaming system determines to provide a tournament point award, the gaming system has a 15% chance of selecting the 20 tournament point award, a 35% chance of selecting the 30 tournament point award, and a 50% chance of selecting the 50 tournament point award.

When the fifth average expected point payout modification event occurs, the gaming system modifies the tournament game such that, until the gaming tournament ends, if the gaming system determines to provide a tournament point award, the gaming system has a 5% chance of selecting the 20 tournament point award, a 20% chance of selecting the 30 tournament point award, and a 75% chance of selecting the 50 tournament point award.

This is merely one example embodiment. The tournament point awards may have any suitable value, the probabilities may be any suitable values, and the average expected point payout modification events may be any suitable events.

TABLE 7

| Probability of providing a tournament point award fo ra play of the tournament game | Probability of tournament point award being selected | Timeframe of 60 minute gaming tournament |
|---|---|---|
| 15% | 20-100% | 0 to 10 minutes |
| 15% | 20-75%<br>30-20%<br>50-5% | 11 to 20 minutes |
| 15% | 20-50%<br>30-35%<br>50-15% | 21 to 30 minutes |
| 15% | 20-25%<br>30-50%<br>50-25% | 31 to 40 minutes |
| 15% | 20-15%<br>30-35%<br>50-50% | 41 to 50 minutes |
| 15% | 20-5%<br>30-20%<br>50-75% | 51 to 60 minutes |

In another embodiment, the probability of providing a tournament point award increases as the gaming tournament progresses. In this embodiment there are a plurality of different available tournament point awards, and the probability that the gaming system will select larger tournament point awards increases as the gaming tournament progresses. Thus, in this embodiment, if the gaming system randomly determines (based on the appropriate probability of providing a tournament point award at that time) to provide a tournament point award, the gaming system randomly selects one of the plurality of tournament point awards (based on the probabilities of being selected associated with the tournament point awards at that time) and provides the selected tournament point award.

Table 8 below illustrates an example embodiment in which the probability of providing a tournament point award increases from 0% to 75% as the gaming tournament progresses, the largest tournament point award's probability of being selected increases from 0% to 75% as the gaming tournament progresses, and the smallest tournament point award's probability of being selected decreases from 100% to 5% as the gaming tournament progresses. This example embodiment includes five average expected point payout modification events: (1) a first average expected point payout modification event that occurs 10 minutes after the start of the gaming tournament, (2) a second average expected point payout modification event that occurs 20 minutes after the start of the gaming tournament, (3) a third average expected point payout modification event that occurs 30 minutes after the start of the gaming tournament, (4) a fourth average expected point payout modification event that occurs 40 minutes after the start of the gaming tournament, and (5) a fifth average expected point payout modification event that occurs 50 minutes after the start of the gaming tournament.

Initially, the gaming system cannot provide a tournament point award. That is, the gaming system has a 0% chance of providing a tournament point award.

When the first average expected point payout modification event occurs, the gaming system modifies the tournament game such that, until the second average expected point payout modification event occurs, the gaming system has a 15% chance of providing a tournament point award and, if the gaming system determines to provide a tournament point award, the gaming system has a 75% chance of selecting the 20 tournament point award, a 20% chance of selecting the 30 tournament point award, and a 5% chance of selecting the 50 tournament point award.

When the second average expected point payout modification event occurs, the gaming system modifies the tournament game such that, until the third average expected point payout modification event occurs, the gaming system has a 30% chance of providing a tournament point award and, if the gaming system determines to provide a tournament point award, the gaming system has a 50% chance of selecting the 20 tournament point award, a 35% chance of selecting the 30 tournament point award, and a 15% chance of selecting the 50 tournament point award.

When the third average expected point payout modification event occurs, the gaming system modifies the tournament game such that, until the fourth average expected point payout modification event occurs, the gaming system has a 45% chance of providing a tournament point award and, if the gaming system determines to provide a tournament point award, the gaming system has a 25% chance of selecting the 20 tournament point award, a 50% chance of selecting the 30 tournament point award, and a 25% chance of selecting the 50 tournament point award.

When the fourth average expected point payout modification event occurs, the gaming system modifies the tournament game such that, until the fifth average expected point payout modification event occurs, the gaming system has a 60% chance of providing a tournament point award and, if the gaming system determines to provide a tournament point award, the gaming system has a 15% chance of selecting the 20 tournament point award, a 35% chance of selecting the 30 tournament point award, and a 50% chance of selecting the 50 tournament point award.

When the fifth average expected point payout modification event occurs, the gaming system modifies the tournament game such that, until the gaming tournament ends, the gaming system has a 75% chance of providing a tournament point award and, if the gaming system determines to provide a tournament point award, the gaming system has a 5% chance of selecting the 20 tournament point award, a 20% chance of selecting the 30 tournament point award, and a 75% chance of selecting the 50 tournament point award.

This is merely one example embodiment. The tournament point awards may have any suitable value, the probabilities may be any suitable values, and the average expected point payout modification events may be any suitable events.

TABLE 8

| Probability of providing a tournament point award for a play of the tournament game | Probability of tournament point award being selected | Timeframe of 60 minute gaming tournament |
|---|---|---|
| 0% | n/a | 0 to 10 minutes |
| 15% | 20-75%<br>30-20%<br>50-5% | 11 to 20 minutes |
| 30% | 20-50%<br>30-35%<br>50-15% | 21 to 30 minutes |

TABLE 8-continued

| Probability of providing a tournament point award for a play of the tournament game | Probability of tournament point award being selected | Timeframe of 60 minute gaming tournament |
|---|---|---|
| 45% | 20-25% | 31 to 40 minutes |
| | 30-50% | |
| | 50-25% | |
| 60% | 20-15% | 41 to 50 minutes |
| | 30-35% | |
| | 50-50% | |
| 75% | 20-5% | 51 to 60 minutes |
| | 30-20% | |
| | 50-75% | |

In certain embodiments, if the gaming system determines to provide a tournament point award, the gaming system does not actually provide the tournament point award until the gaming system receives a particular input from the tournament player. For instance, in one example embodiment, when the gaming system determines to provide a tournament point award, the gaming system displays an indicator that represents the tournament point award (such as a pop-up bubble) on the display device of the tournament player's EGM. The gaming system provides the tournament player the tournament point award only if the tournament player's EGM receives a designated input via an input device, such as a touch of the displayed indicator via the touch screen. In this example embodiment, the gaming system does not provide the tournament player the tournament point award if the tournament player's EGM does not receive the designated input within a certain period of time.

3.5 Decreasing the Average Expected Point Payout of a Tournament Game by Removing a Feature from the Tournament Game In certain embodiments, the gaming system decreases the average expected point payout of a tournament game by removing a feature from the tournament game (such as a prior modification to the tournament game). Table 9 below illustrates an example embodiment in which the gaming system can initially randomly provide a 5× multiplier during a tournament, loses that ability, and later regains that ability. This example embodiment includes two average expected point payout modification events: (1) a first average expected point payout modification event that occurs 10 minutes after the start of the gaming tournament, and (2) a second average expected point payout modification event that occurs 50 minutes after the start of the gaming tournament.

Initially, the gaming system has a 25% chance of providing a multiplier for each play of the tournament game.

When the first average expected point payout modification event occurs, the gaming system modifies the tournament game such that, for each subsequent play of the tournament game until the second average expected point payout modification event occurs, the gaming system has a 0% chance of providing a multiplier.

When the second average expected point payout modification event occurs, the gaming system modifies the tournament game such that, for each subsequent play of the tournament game until the gaming tournament ends, the gaming system has a 75% chance of providing a multiplier.

This is merely one example embodiment. The multiplier may have any suitable value, the probabilities may be any suitable values, and the average expected point payout modification events may be any suitable events.

TABLE 9

| Probability of providing a multiplier for a play of the tournament game | Multiplier | Timeframe of 60 minute gaming tournament |
|---|---|---|
| 25% | 5× | 0 to 10 minutes |
| 0% | n/a | 11 to 50 minutes |
| 75% | 5× | 51 to 60 minutes |

3.6 Increasing the Average Expected Point Payout of a Tournament Game by Modifying the Paytable of the Tournament Game In certain embodiments, the gaming system increases the average expected point payout of a tournament game by modifying the paytable of the tournament game. The gaming system may do so in any of a variety of manners, such as by increasing the award associated with one or more winning outcomes in the paytable, increasing the probability of occurrence of one or more winning outcomes in the paytable, adding new winning outcomes to the paytable, or using a different paytable having one of these features.

3.7 Decreasing the Average Expected Point Payout of a Tournament Game by Modifying the Paytable of the Tournament Game Conversely, in certain embodiments, the gaming system decreases the average expected point payout of a tournament game by modifying the paytable of the tournament game. The gaming system may do so in any of a variety of manners, such as by decreasing the award associated with one or more winning outcomes in the paytable, decreasing the probability of occurrence of one or more winning outcomes in the paytable, removing winning outcomes from the paytable, or using a different paytable having one of these features.

4. Variations

The present disclosure contemplates that:

(a) the average expected point payout;

(b) the tournament start event;

(c) the tournament termination event;

(d) the average expected point payout modification events;

(e) the quantity of average expected point payout modification events included in a tournament;

(f) the quantity of times an average expected point payout modification event can occur during a tournament;

(g) the tournament game modification(s) associated with each average expected point payout modification event; or (h) any other variables or determinations described herein may be: (1) predetermined; (2) randomly determined; (3) randomly determined based on one or more weighted percentages (such as according to a weighted table); (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an EGM; (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15)

determined independent of one or more side wagers placed; (16) determined based on the player's primary game wager or wager level; (17) determined independent of the player's primary game wager or wager level; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more other determinations disclosed herein; (25) determined independent of any other determination disclosed herein; or (26) determined in any other suitable manner or based on or independent of any other suitable factor(s).

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal computing device" as used herein represents one personal computing device or a plurality of personal computing devices, and "central server, central controller, or remote host" as used herein represents one central server, central controller, or remote host or a plurality of central servers, central controllers, or remote hosts.

Figure 2:
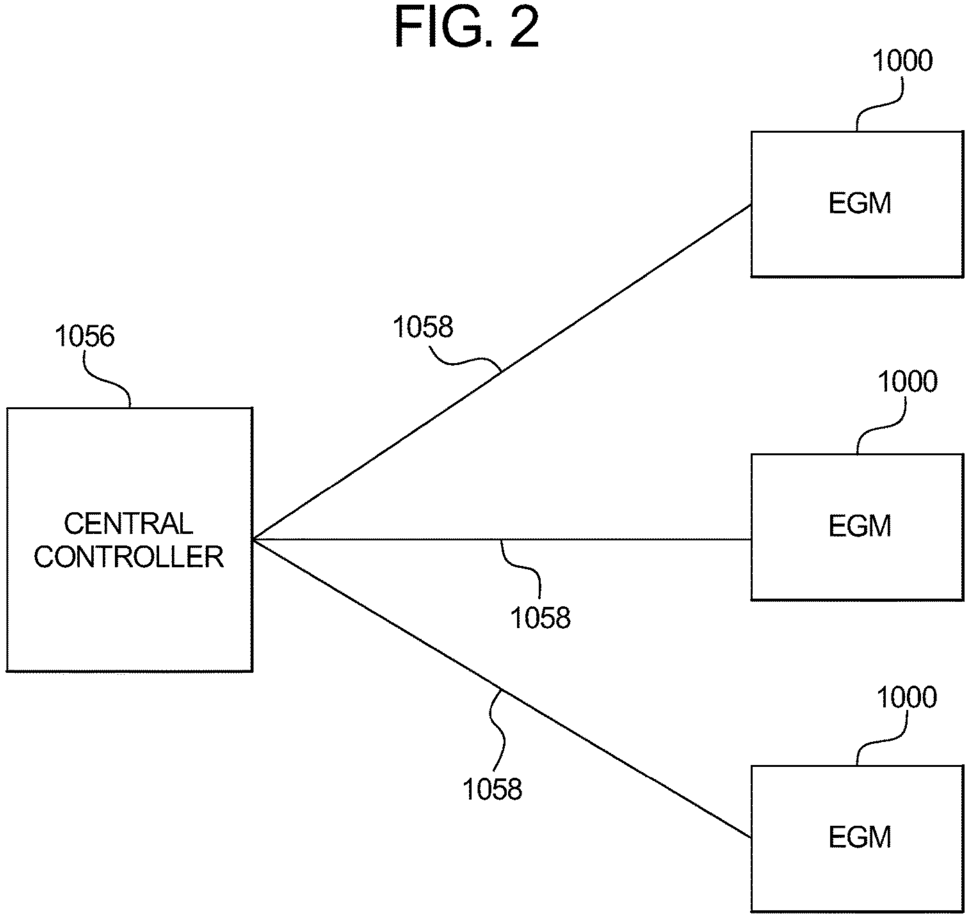
FIG. 2 is a schematic block diagram of one embodiment of a network configuration of the gaming system of the present disclosure.

As noted above, in various embodiments, the gaming system includes an EGM (or personal computing device) in combination with a central server, central controller, or remote host. In such embodiments, the EGM (or personal computing device) is configured to communicate with the central server, central controller, or remote host through a data network or remote communication link. In certain such embodiments, the EGM (or personal computing device) is configured to communicate with another EGM (or personal computing device) through the same data network or remote communication link or through a different data network or remote communication link. For example, the gaming system illustrated in FIG. 2 includes a plurality of EGMs 1000 that are each configured to communicate with a central server, central controller, or remote host 1056 through a data network 1058.

In certain embodiments in which the gaming system includes an EGM (or personal computing device) in combination with a central server, central controller, or remote host, the central server, central controller, or remote host is any suitable computing device (such as a server) that includes at least one processor and at least one memory device or data storage device. As further described herein, the EGM (or personal computing device) includes at least one EGM (or personal computing device) processor configured to transmit and receive data or signals representing events, messages, commands, or any other suitable information between the EGM (or personal computing device) and the central server, central controller, or remote host. The at least one processor of that EGM (or personal computing device) is configured to execute the events, messages, or commands represented by such data or signals in conjunction with the operation of the EGM (or personal computing device). Moreover, the at least one processor of the central server, central controller, or remote host is configured to transmit and receive data or signals representing events, messages, commands, or any other suitable information between the central server, central controller, or remote host and the EGM (or personal computing device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal computing device). Further, one, more than one, or each of the functions of the at least one processor of the EGM (or personal computing device) may be performed by the at least one processor of the central server, central controller, or remote host.

In certain such embodiments, computerized instructions for controlling any games (such as any primary or base games and/or any secondary or bonus games) displayed by the EGM (or personal computing device) are executed by the central server, central controller, or remote host. In such "thin client" embodiments, the central server, central controller, or remote host remotely controls any games (or other suitable interfaces) displayed by the EGM (or personal computing device), and the EGM (or personal computing device) is utilized to display such games (or suitable interfaces) and to receive one or more inputs or commands. In other such embodiments, computerized instructions for controlling any games displayed by the EGM (or personal computing device) are communicated from the central server, central controller, or remote host to the EGM (or personal computing device) and are stored in at least one memory device of the EGM (or personal computing device). In such "thick client" embodiments, the at least one processor of the EGM (or personal computing device) executes the computerized instructions to control any games (or other suitable interfaces) displayed by the EGM (or personal computing device).

In various embodiments in which the gaming system includes a plurality of EGMs (or personal computing devices), one or more of the EGMs (or personal computing devices) are thin client EGMs (or personal computing devices) and one or more of the EGMs (or personal computing devices) are thick client EGMs (or personal computing devices). In other embodiments in which the gaming system includes one or more EGMs (or personal computing devices), certain functions of one or more of the EGMs (or personal computing devices) are implemented in a thin client environment, and certain other functions of one or more of the EGMs (or personal computing devices) are implemented in a thick client environment. In one such embodiment in which the gaming system includes an EGM (or personal computing device) and a central server, central controller, or remote host, computerized instructions for controlling any primary or base games displayed by the EGM (or personal computing device) are communicated from the central server, central controller, or remote host to the EGM (or personal computing device) in a thick client configuration, and computerized instructions for controlling any secondary or bonus games or other functions displayed by the EGM (or personal computing device) are executed by the central server, central controller, or remote host in a thin client configuration.

In certain embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a local area network (LAN) in which the EGMs (or personal computing devices) are located substantially proximate to one another and/or the central server, central controller, or remote host. In one example, the EGMs (or personal computing devices) and the central server, central controller, or remote host are located in a gaming establishment or a portion of a gaming establishment.

In other embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a wide area network (WAN) in which one or more of the EGMs (or personal computing devices) are not necessarily located substantially proximate to another one of the EGMs (or personal computing devices) and/or the central server, central controller, or remote host. For example, one or more of the EGMs (or personal computing devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal computing devices) are located. In certain embodiments in which the data network is a WAN, the gaming system includes a central server, central controller, or remote host and an EGM (or personal computing device) each located in a different gaming establishment in a same geographic area, such as a same city or a same state. Gaming systems in which the data network is a WAN are substantially identical to gaming systems in which the data network is a LAN, though the quantity of EGMs (or personal computing devices) in such gaming systems may vary relative to one another.

In further embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is an internet (such as the Internet) or an intranet. In certain such embodiments, an Internet browser of the EGM (or personal computing device) is usable to access an Internet game page from any location where an Internet connection is available. In one such embodiment, after the EGM (or personal computing device) accesses the Internet game page, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal computing device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal computing device). Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

The central server, central controller, or remote host and the EGM (or personal computing device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal computing devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3:
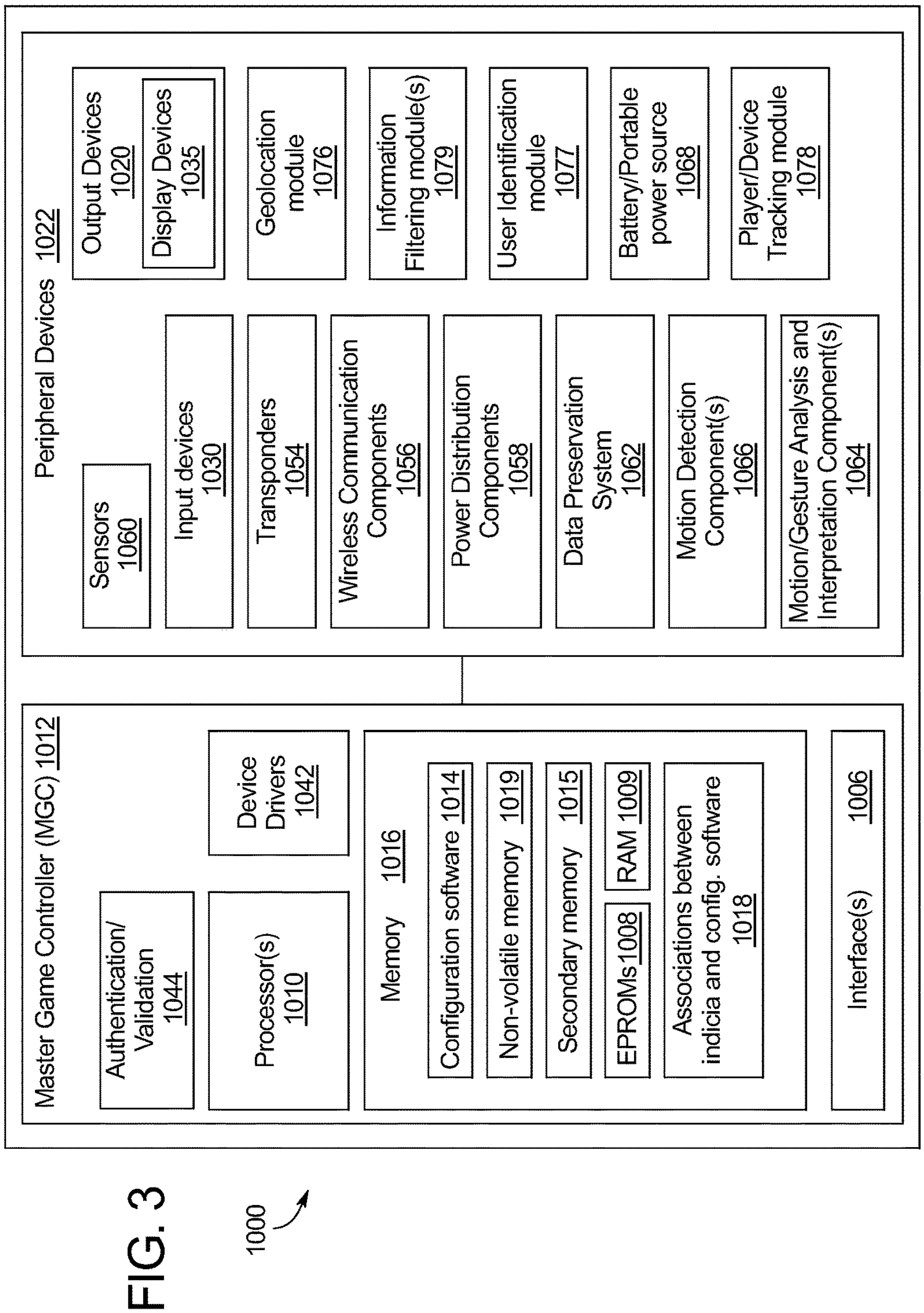
FIG. 3 is a schematic block diagram of an example electronic configuration of the gaming system of the present disclosure.
Figure 4A:
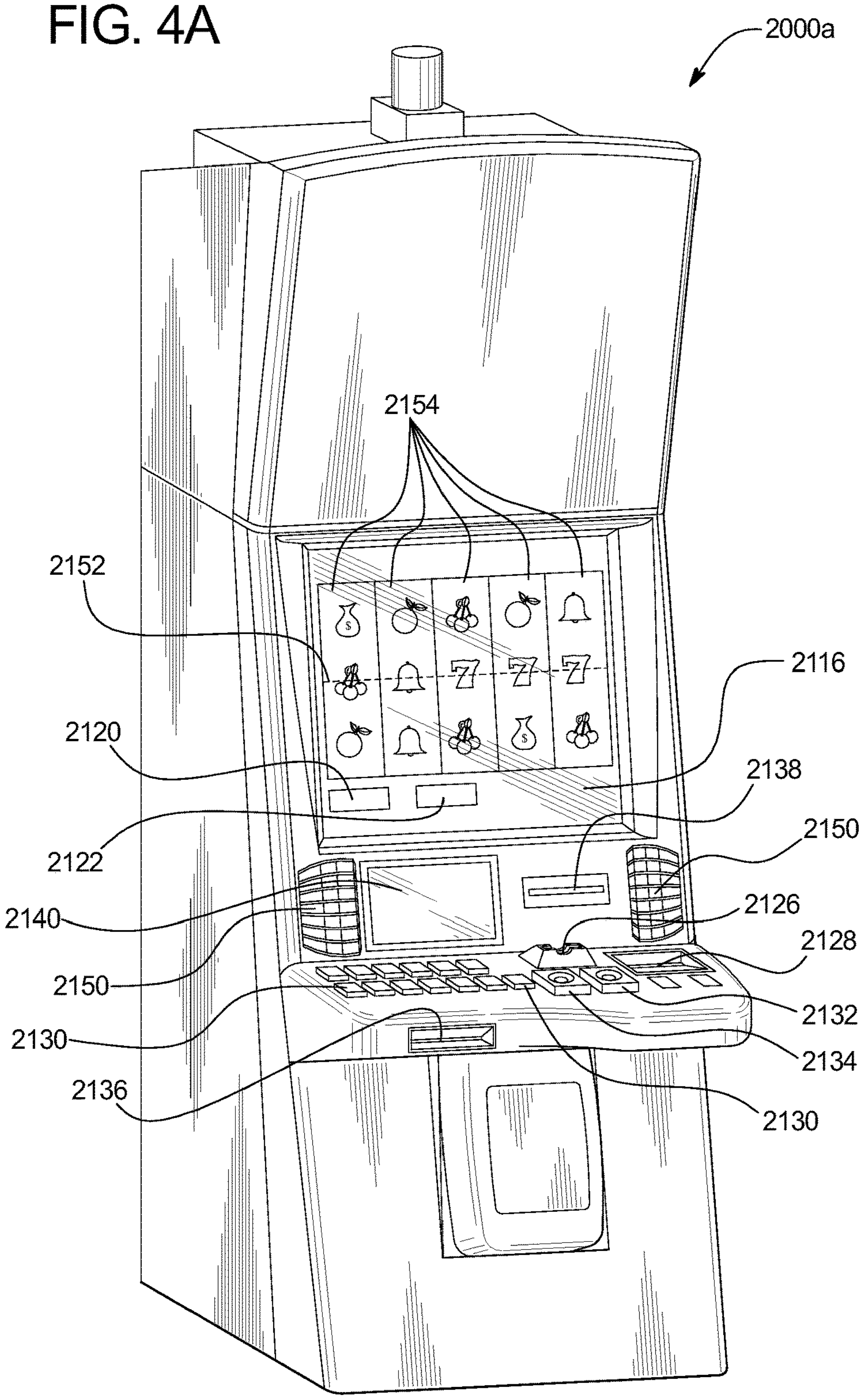
FIGS. 4A and 4B are perspective views of example alternative embodiments of the gaming system of the present disclosure.
Figure 4B:
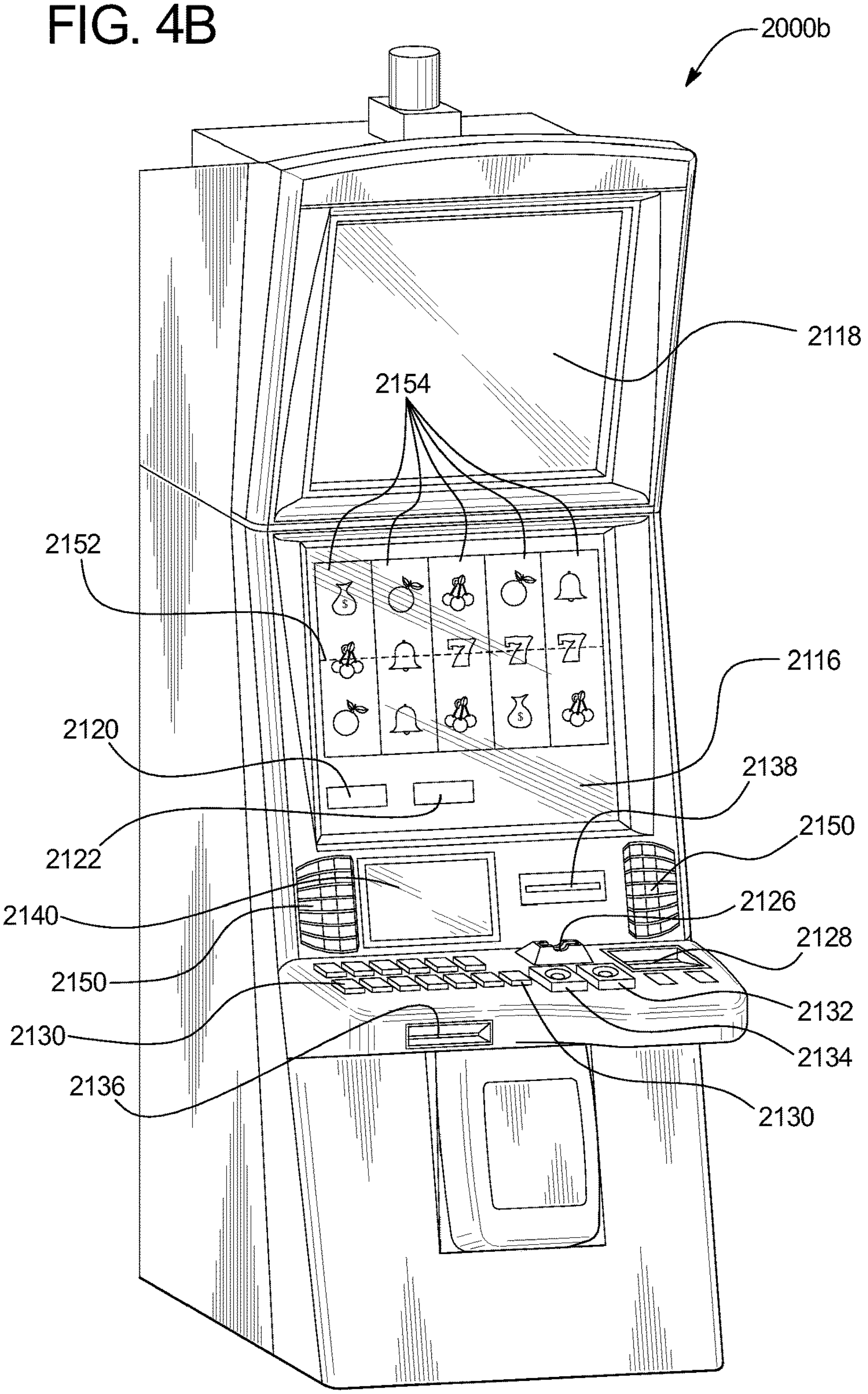

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrates in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled “Using Multiple Bingo Cards to Represent Multiple Slot Paylines and Other Class III Game Options”; U.S. Pat. No. 7,731,581, entitled “Multi-Player Bingo Game with Multiple Alternative Outcome Displays”; U.S. Pat. No. 7,955,170, entitled “Providing Non-Bingo Outcomes for a Bingo Game”; U.S. Pat. No. 8,070,579, entitled “Bingo System with Downloadable Common Patterns”; and U.S. Pat. No. 8,500,538, entitled “Bingo Gaming System and Method for Providing Multiple Outcomes from Single Bingo Pattern,” which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled “Gaming Machine Having a Lottery Game and Capability for Integration with Gaming Device Accounting System and Player Tracking System,” and U.S. Pat. No. 8,597,116, entitled “Virtual Player Tracking and Related Services,” which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 4B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled “Gaming Device and Method Having Independent Reels and Multiple Ways of Winning”; U.S. Pat. No. 8,241,104, entitled “Gaming Device and Method Having Designated Rules for Determining Ways To Win”; and U.S. Pat. No. 8,430,739, entitled “Gaming System and Method Having Wager Dependent Different Symbol Evaluations,” which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. No. 6,804,763, entitled “High Performance Battery Backed RAM Interface”; U.S. Pat. No. 6,863,608, entitled “Frame Capture of Actual Game Play”; U.S. Pat. No. 7,111,141, entitled “Dynamic NV-RAM”; and U.S. Pat. No. 7,384,339, entitled, “Frame Capture of Actual Game Play,” which are incorporated herein by reference.

Another feature of EGMs is that they often include unique interfaces, including serial interfaces, to connect to specific subsystems internal and external to the EGM. The serial devices may have electrical interface requirements that differ from the “standard” EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT’s Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled “Process Verification,” which is incorporated herein by reference.

In at least one embodiment, at least a portion of the trusted memory devices/sources may correspond to memory that cannot easily be altered (e.g., “unalterable memory”) such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other’s identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
a plurality of gaming machines each comprising:
at least one processor;
at least one display device;
an acceptor configured to accept a physical item associated with a monetary value to facilitate establishment of a credit balance;
at least one input device; and
at least one memory device that stores a plurality of instructions that, when executed by the at least one processor, cause the at least one processor to, during a gaming tournament:
(a) enable a tournament player of said gaming machine to play a tournament game, the tournament game having an average expected point payout; and
(b) for each play of the tournament game:
(1) determine an outcome and cause the at least one display device to display the outcome;
(2) determine any game award associated with the outcome and cause the at least one display device to display any game award associated with the outcome, any game award associated with a quantity of tournament points; and
(3) accumulate any tournament points associated with any determined game award; and
a tournament controller configured to operate with a designated quantity of the gaming machines to enable the designated quantity of gaming machines to each enable a tournament player to participate in the gaming tournament, wherein (1) the designated quantity of gaming machines is all of the gaming machines that participate in the gaming tournament, and (2) the designated quantity of gaming machines remains the same throughout the gaming tournament, and:
(a) if a first average expected point payout modification event occurs during the gaming tournament, for each one of the designated quantity of gaming machines, cause a modification of the average expected point payout of the tournament game in a first manner such that at least one subsequent play of the tournament game has said modified average expected point payout;
(b) if a second average expected point payout modification event occurs during the gaming tournament, for each one of the designated quantity of gaming machines, cause a modification of the average expected point payout of the tournament game in a second manner such that at least one subsequent play of the tournament game has said modified average expected point payout, the second average expected point payout modification event being different from the first average expected point payout modification event and the second manner of modification being different from the first manner of modification; and
(c) if a tournament termination event occurs, determine a tournament winner based on the quantities of accumulated tournament points of the tournament players and provide a monetary tournament award to the tournament winner.

2. The gaming system of claim 1, wherein the first average expected point payout modification event occurs at a first designated point in time following a start of the gaming tournament.

3. The gaming system of claim 2, wherein the second average expected point payout modification event occurs at a second designated point in time following the first designated point in time.

4. The gaming system of claim 1, wherein the first manner of modification of the average expected point payout of the tournament game includes decreasing the average expected point payout of the tournament game.

5. The gaming system of claim 4, wherein the second manner of modification of the average expected point payout of the tournament game includes increasing the average expected point payout of the tournament game.

6. The gaming system of claim 1, wherein the first average expected point payout modification event occurs at a first designated point in time following a start of the gaming tournament, the second average expected point payout modification event occurs at a second designated point in time following the first designated point in time, the first manner of modification of the average expected point payout of the tournament game includes decreasing the average expected point payout of the tournament game, and the second manner of modification of the average expected point payout of the tournament game includes increasing the average expected point payout of the tournament game.

7. The gaming system of claim 1, wherein following modification of the average expected point payout of the tournament game in at least one of the first and second manners of modification, a tournament point multiplier can be randomly provided to one of the tournament players.

8. The gaming system of claim 1, wherein following modification of the average expected point payout of the tournament game in at least one of the first and second manners of modification, a tournament point award can be to be randomly provided to one of the tournament players.

9. The gaming system of claim 1, wherein following modification of the average expected point payout of the tournament game in at least one of the first and second manners of modification, a paytable used to determine whether the outcome of a play of the tournament game is associated with a game award differs from a previously-used paytable.

10. A method of operating a gaming system, said method comprising:

(a) for each of a plurality of gaming machines participating in a gaming tournament, enabling a tournament player of said gaming machine to play a tournament game, the tournament game having an average expected point payout, wherein the plurality of gaming machines participating in the gaming tournament remain the same throughout the gaming tournament;

(b) for each of the plurality of gaming machines, for each play of the tournament game on said gaming machine:

(1) determining, by at least one processor, and displaying, by at least one display device of said gaming machine, an outcome;

(2) determining, by the at least one processor, and displaying, by the at least one display device of said gaming machine, any game award associated with the outcome, any game award associated with a quantity of tournament points; and (3) accumulating, by the at least one processor, any tournament points associated with any determined game award;

(c) if a first average expected point payout modification event occurs during the tournament, for each of the plurality of gaming machines, causing, by the at least one processor, a modification of the average expected point payout of the tournament game in a first manner such that at least one subsequent play of the tournament game has said modified average expected point payout;

(d) if a second average expected point payout modification event occurs during the tournament, for each of the plurality of gaming machines, causing, by the at least one processor, a modification of the average expected point payout of the tournament game in a second manner such that at least one subsequent play of the tournament game has said modified average expected point payout, the second average expected point payout modification event being different from the first average expected point payout modification event and the second manner of modification being different from the first modification; and (e) if a tournament termination event occurs, determining, by the at least one processor, a tournament winner based on the quantities of accumulated points of the tournament players and providing a monetary tournament award to the tournament winner.

11. The method of claim 10, wherein the first average expected point payout modification event occurs at a first designated point in time following a start of the gaming tournament.

12. The method of claim 11, wherein the second average expected point payout modification event occurs at a second designated point in time following the first designated point in time.

13. The method of claim 10, wherein the first manner of modification of the average expected point payout of the tournament game includes decreasing the average expected point payout of the tournament game.

14. The method of claim 13, wherein the second manner of modification of the average expected point payout of the tournament game includes increasing the average expected point payout of the tournament game.

15. The method of claim 10, wherein the first average expected point payout modification event occurs at a first designated point in time following a start of the gaming tournament, the second average expected point payout modification event occurs at a second designated point in time following the first designated point in time, the first manner of modification of the average expected point payout of the tournament game includes decreasing the average expected point payout of the tournament game, and the second manner of modification of the average expected point payout of the tournament game includes increasing the average expected point payout of the tournament game.

16. The method of claim 10, wherein following modification of the average expected point payout of the tournament game in at least one of the first and second manners of modification, a tournament point multiplier can be randomly provided to one of the tournament players.

17. The method of claim 10, wherein following modification of the average expected point payout of the tournament game in at least one of the first and second manners of modification, a tournament point award can be to be randomly provided to one of the tournament players.

18. The method of claim 10, wherein following modification of the average expected point payout of the tournament game in at least one of the first and second manners of modification, a paytable used to determine whether the outcome of a play of the tournament game is associated with a game award differs from a previously-used paytable.

19. The method of claim 10, which is at least partially provided through a data network.

20. The method of claim 19, wherein the data network is an internet.

* * * * *